US012743536B2

(12) United States Patent
Moon et al.

(10) Patent No.: US 12,743,536 B2
(45) Date of Patent: Sep. 22, 2026

(54) SECURITY COMPUTER DEVICE AND METHOD FOR KEY-VALUE STORE USING LOG-STRUCTURED MERGE-TREE

(71) Applicant: UNIST (ULSAN NATIONAL INSTITUTE OF SCIENCE AND TECHNOLOGY), Ulsan (KR)

(72) Inventors: Hyungon Moon, Ulsan (KR); Sam Hyuk Noh, Ulsan (KR); Ig Jae Kim, Ulsan (KR); Junghyun Kim, Ulsan (KR); Minu Chung, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 210 days.

(21) Appl. No.: 18/838,987

(22) PCT Filed: Feb. 16, 2023

(86) PCT No.: PCT/KR2023/002276
§ 371 (c)(1),
(2) Date: Nov. 8, 2024

(87) PCT Pub. No.: WO2023/158239
PCT Pub. Date: Aug. 24, 2023

(65) Prior Publication Data

US 2025/0139272 A1 May 1, 2025

(30) Foreign Application Priority Data

Feb. 18, 2022 (KR) ........................ 10-2022-0021722

(51) Int. Cl.
*G06F 21/62* (2013.01)
*G06F 21/60* (2013.01)
*G06F 21/64* (2013.01)

(52) U.S. Cl.
CPC ........ *G06F 21/6218* (2013.01); *G06F 21/602* (2013.01); *G06F 21/64* (2013.01)

(58) Field of Classification Search
CPC .... G06F 21/6218; G06F 21/602; G06F 21/64; G06F 16/22; G06F 21/50; G06F 21/62;
(Continued)

(56) References Cited

U.S. PATENT DOCUMENTS

| | | | | |
|---|---|---|---|---|
| 11,288,212 B2 * | 3/2022 | Ki | ....................... | G06F 21/6218 |
| 2021/0144170 A1 * | 5/2021 | Ganapathy | .......... | H04L 63/1475 |
| 2022/0335028 A1 * | 10/2022 | Xue | .................... | G06F 16/2246 |

FOREIGN PATENT DOCUMENTS

| | | |
|---|---|---|
| CN | 113094372 A | 7/2021 |
| CN | 113536364 A | 10/2021 |
| KR | 1020210078437 A | 6/2021 |

OTHER PUBLICATIONS

Bailleu, Maurice, et al., "SPEICHER: Securing LSM-based Key-Value Stores using Shielded Execution", 17th USENIX Conference on File and Storage Technologies, Feb. 2019.

(Continued)

*Primary Examiner* — Sm A Rahman
(74) *Attorney, Agent, or Firm* — Kolitch Romano Dascenzo Gates LLP

(57) ABSTRACT

A device according to one embodiment may comprise: a memory including an Enclave Page Cache (EPC) and a partial memory distinguished from the EPC; a storage distinguished from the memory; and a processor, which receives a lookup request including an object key from a user, retrieves the object key from a table stored in the EPC, retrieves the object key from a table of a log-structured merge-tree stored in the storage if the object key is not retrieved from the table stored in the EPC, acquires a reference message authentication code and a value corresponding to the object key from the storage if the object key (Continued)

is retrieved from the target table of the log-structured merge-tree stored in the storage, and verifies the integrity of the value on the basis of the reference message authentication code.

15 Claims, 11 Drawing Sheets

(58) Field of Classification Search
CPC ... G06F 16/2246; G06F 16/2282; H04L 9/32; H04L 9/3242
See application file for complete search history.

(56) References Cited

OTHER PUBLICATIONS

Karapanos, Nikolaos, et al., "Verena: End-to-End Integrity Protection for Web Applications", 2016 IEEE Symposium on Security and Privacy, 2016.

Kim, Igjae, et al., "A Log-Structured Merge Tree-aware Message Authentication Scheme for Persistent Key-Value Stores", 20th USENIX Conference on File and Storage Technologies, Feb. 2022.

Kim, Taehoon, et al., "ShieldStore: Shielded In-memory Key-value Storage with SGX", 2019 Association for Computing Machinery, Mar. 2019.

Li, Kai, et al., "Authenticated Key-Value Stores with Hardware Enclaves", 2021 Association for Computing Machiner, Dec. 2021.

Lu, Lanyue, et al., "WiscKey: Separating Keys from Values in SSD-conscious Storage", 14th USENIX Conference on File and Storage Technologies, Feb. 2016.

Matetic, Sinisa, et al., "ROTE: Rollback Protection for Trusted Execution", 26th USENIX Security Symposium, Aug. 2017.

Parno, Bryan, et al., "Memoir: Practical State Continuity for Protected Modules", 2011 IEEE Symposium on Security and Privacy, 2011.

Yang, Fan, et al., "Aria: Tolerating Skewed Workloads in Secure In-memory Key-value Stores", Tsinghua University, Apr. 2021.

International Search Report of the Korean Intellectual Property Office in PCT application No. PCT/KR2023/002276 issued on May 22, 2023, which is an international application to which this application claims priority.

* cited by examiner

SECURITY COMPUTER DEVICE AND METHOD FOR KEY-VALUE STORE USING LOG-STRUCTURED MERGE-TREE

TECHNICAL FIELD

Hereinafter, a technique relating to a security computer device for ensuring the freshness of a key-value store is disclosed.

BACKGROUND ART

Persistent key-value stores (KVSs) can be widely used for recent software products. KVSs can be used by cloud-based services (e.g., Netflix, Facebook, and Uber) directly or indirectly as a storage engine for large-scale data processing or database management systems.

KVSs may be responsible for securely maintaining service data, including user credentials and private information. Most KVSs can run on public cloud services, leaving their content potentially open to anyone with control of the cloud platform's privileged software or physical machines. Thus, cloud-based services may be motivated to protect their KVSs with the strongest mechanism available. KVSs can be protected through hardware-based confidential computing (e.g., Intel Software Guard Extensions (SGX) and Keystone Enclave).

Hardware-based confidential computing may offer strong security guarantees to KVSs. Hardware-based confidential computing may use a cryptographic operation including unlock which requires an encryption key owned by a client.

DISCLOSURE OF THE INVENTION

Technical Solutions

A method, performed by a processor, according to an embodiment may include receiving a lookup request including an object key from a user, retrieving the object key from a table stored in an enclave page cache (EPC) of a memory, retrieving the object key from a table of a log-structured merge-tree stored in a storage distinct from the memory, when the object key fails to be retrieved from the table stored in the EPC, obtaining a value corresponding to the object key and a reference message authentication code from the storage, when the object key is retrieved from a target table of the log-structured merge-tree stored in the storage, and verifying an integrity of the value based on the reference message authentication code.

The verifying of the integrity of the value based on the reference message authentication code may include obtaining, from the EPC, a target authentication key mapped to the target table among authentication keys mapped to tables of the log-structured merge-tree, computing a comparative message authentication code for the value, based on the target authentication key obtained from the EPC and the value obtained from the storage, and verifying the integrity of the value by comparing the computed comparative message authentication code with the obtained reference message authentication code.

The retrieving of the object key from the table of the log-structured merge-tree stored in the storage may include initiating a retrieval of the object key, starting from a lowest level of the log-structured merge-tree stored in the storage, re-retrieving the object key from a level subsequent to a level at which the retrieval of the object key is being performed, when the object key fails to be retrieved at the level at which the retrieval of the object key is being performed, and terminating the retrieval of the object key, when the object key is retrieved at the level at which the retrieval of the object key is being performed.

The retrieving of the object key from the table of the log-structured merge-tree stored in the storage may include determining a target data block having a possibility of including the object key, based on an index block of the target table among a plurality of data blocks of the target table of the log-structured merge-tree, the index block indicating a range of an object key included in the plurality of data blocks, verifying an order of a key block having object keys of a plurality of key-value pairs of the target data block, and retrieving the object key from the key block, when the order of the key block of the target data block is verified.

The retrieving of the object key from the table of the log-structured merge-tree stored in the storage may further include re-retrieving the object key by changing the target table to a table of a subsequent level of the target table, when the object key fails to be retrieved from the key block of the target data block.

The obtaining of the value corresponding to the object key and the reference message authentication code from the storage may include obtaining the value corresponding to the object key and the reference message authentication code corresponding to the value from a value block of the target data block, when the object key is retrieved from a key block of the target data block.

The method according to an embodiment may further include obtaining a reference message authentication code corresponding to the object key and a target authentication key corresponding to a table stored in the EPC from the EPC, when the object key is retrieved from the table stored in the EPC, obtaining a value corresponding to the object key from a partial memory of the memory distinct from the EPC, and verifying the integrity of the value based on the reference message authentication code.

The verifying of the integrity of the value based on the reference message authentication code may include computing a comparative message authentication code based on the target authentication key mapped to the table stored in the EPC obtained from the EPC and the value obtained from the partial memory distinct from the EPC, and verifying the integrity of the value by comparing the computed comparative message authentication code with the reference message authentication code.

A device according to an embodiment may include a memory including an EPC and a partial memory distinct from the EPC, a storage distinct from the memory, and a processor configured to receive a lookup request including an object key from a user, retrieve the object key from a table stored in the EPC, retrieve the object key from a table of a log-structured merge-tree stored in a storage distinct from the memory, when the object key fails to be retrieved from the table stored in the EPC, obtain a value corresponding to the object key and a reference message authentication code from the storage, when the object key is retrieved from a target table of the log-structured merge-tree stored in the storage, and verify an integrity of the value based on the reference message authentication code.

The processor may be configured to obtain, from the EPC, a target authentication key mapped to the target table among authentication keys mapped to tables of the log-structured merge-tree, compute a comparative message authentication code for the value, based on the target authentication key obtained from the EPC and the value obtained from the storage, and verify the integrity of the value by comparing the computed comparative message authentication code with the obtained reference message authentication code.

The processor may be configured to initiate a retrieval of the object key, starting from a lowest level of the log-structured merge-tree stored in the storage, re-retrieve the object key from a level subsequent to a level at which the retrieval of the object key is being performed, when the object key fails to be retrieved at the level at which the retrieval of the object key is being performed, and terminate the retrieval of the object key, when the object key is retrieved at the level at which the retrieval of the object key is being performed.

The processor may be configured to determine a target data block having a possibility of including the object key, based on an index block of the target table among a plurality of data blocks of the target table of the log-structured merge-tree, the index block indicating a range of an object key included in the plurality of data blocks, verify an order of a key block having object keys of a plurality of key-value pairs of the target data block, and retrieve the object key from the key block, when the order of the key block of the target data block is verified.

The processor may be configured to re-retrieve the object key by changing the target table to a table of a subsequent level of the target table, when the object key fails to be retrieved from the key block of the target data block.

The processor may be configured to obtain the value corresponding to the object key and the reference message authentication code corresponding to the value from a value block of the target data block, when the object key is retrieved from a key block of the target data block.

The processor may be configured to obtain a reference message authentication code corresponding to the object key and a target authentication key corresponding to a table stored in the EPC from the EPC, when the object key is retrieved from the table stored in the EPC, obtain a value corresponding to the object key from a partial memory of the memory distinct from the EPC, and verify the integrity of the value based on the reference message authentication code.

The processor may be configured to compute a comparative message authentication code based on the target authentication key mapped to the table stored in the EPC obtained from the EPC and the value obtained from the partial memory distinct from the EPC, and verify the integrity of the value by comparing the computed comparative message authentication code with the reference message authentication code.

BEST MODE FOR CARRYING OUT THE INVENTION

Figure 1:
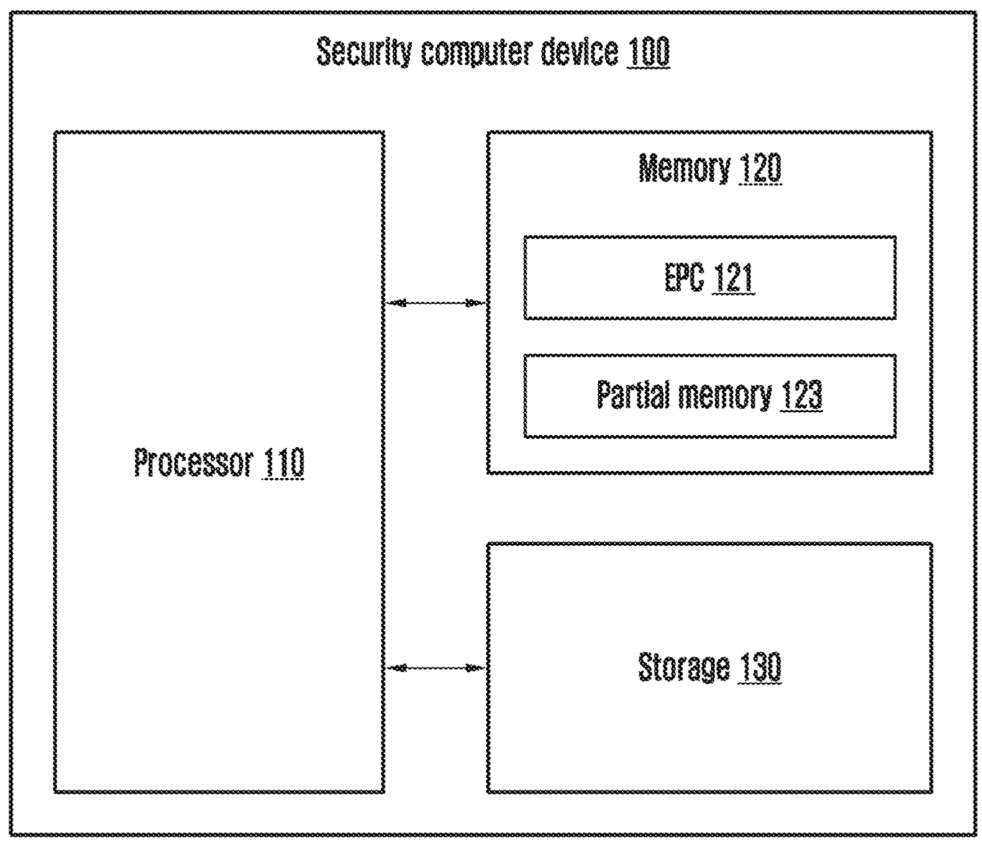
FIG. 1 is a block diagram illustrating a security computing device according to an embodiment.

The following detailed structural or functional description is provided as an example only and various alterations and modifications may be made to the embodiments. Accordingly, the embodiments are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is “connected”, “coupled”, or “joined” to another component, a third component may be “connected”, “coupled”, and “joined” between the first and second components, although the first component may be directly connected, coupled, or joined to the second component.

The singular forms “a”, “an”, and “the” are intended to include the plural forms as well, unless the context clearly indicates otherwise. It will be further understood that the terms “comprises/comprising” and/or “includes/including” when used herein, specify the presence of stated features, integers, steps, operations, elements, and/or components, but do not preclude the presence or addition of one or more other features, integers, steps, operations, elements, components and/or groups thereof.

Unless otherwise defined, all terms used herein including technical or scientific terms have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like components, and any repeated description related thereto will be omitted.

Before going into details, the term "key" may have several meanings. For example, a "key" may be used to encrypt and/or decrypt data. In general, this key may be referred to as an "encryption key". As another example, a "key" may be used to compute a message authentication code (MAC) to verify the integrity of data based on the data. In general, this key may be referred to as an "authentication key". As still another example, a "key" may refer to information used to identify a predetermined object in a key-value store (KVS). In general, this key may be referred to as an "object key". If the term "key" is used without a modifier, what type of key is intended may be clearly understood from the context.

FIG. 1 is a block diagram illustrating a security computing device according to an embodiment.

A security computing device 100 may include a processor 110, a memory 120, and a storage 130. The security computing device 100 may be used to access data stored in a key-value store (KVS) and guarantee integrity. The KVS will be described with reference to FIG. 2.

The processor 110 may be configured to read a stored instruction and execute the instruction as necessary. In response to a lookup request from a user, the processor 110 may retrieve an object key of the lookup request from the memory 120 and the storage 130.

The processor 110 according to an embodiment may include a processor that supports an enclave. An enclave may be a reliable execution environment embodied in a processor or an application to provide a secure region (e.g., a separated and encrypted region) for internally storing data and executing code, in the context of an operating system process. For example, a processor supporting an enclave may use Intel Software Guard Extensions (SGX). As described later, an enclave may be executed in an enclave page cache (EPC) 121 where data is protected using an access control mechanism provided by a processor associated with an enclave instruction.

Intel SGX (hereinafter, referred to as the SGX) may be a new execution mode on processors having instructions used for memory protection semantic systems and management. The SGX may generate an enclave by filling protected memory pages with desired instructions and data, locking the instructions and data in an enclave, and performing measurements in the memory pages. The processor may execute instructions in the enclave. The processor and another entity (e.g., an attacker) may not have the authority to read and record memory pages belonging to the enclave.

A processor supporting an enclave may be recognized as having an instruction set architecture including a plurality of secure enclave instructions that enable secure data to be stored and executed using an enclave.

The memory 120 may include the EPC 121 and a partial memory 123, as volatile memory. Volatile memory may be a memory device that stores data only when power is supplied thereto and loses the stored data when the power supply is cut off. For example, volatile memory may include at least one of static random-access memory (SRAM) and dynamic random-access memory (DRAM).

The EPC 121 may be where enclave instructions are executed and protected enclave data is accessed. The EPC may be positioned in a physical address space of the security computing device 100 but accessible only by an enclave instruction (e.g., a program being executed in the enclave. Data in the EPC 121 may be protected through an access control mechanism provided by a processor associated with enclave instructions.

As shown in FIG. 1, the EPC 121 may be implemented as part of the memory 120. The EPC may hold pages from a number of enclaves and provide an access control mechanism to protect the integrity and confidentiality of the pages. A page cache may maintain a consistent protocol similar to the protocol used for consistent physical memory in the security computing device 100. Enclave pages may be loaded into the EPC by an operating system.

The partial memory 123 may be a partial memory of the memory 120, and may be the remaining volatile memory except for the EPC 121. Data in the partial memory 123 may be cryptographically protected by encryption and a message authentication code (MAC). The partial memory 123 may be expressed as untrusted volatile memory compared to the EPC which is trusted volatile memory.

The storage 130 may include a storage device distinct from the memory 120. For example, the storage 130 may include at least one of a solid-state drive (SSD) and a hard disk drive (HDD).

Data in the storage 130 may be protected by encryption and a MAC.

The processor 110 may encrypt and authenticate data using the MAC by a memory encryption engine, when transmitting the data to the outside of the EPC 121 (e.g., the partial memory 123 of the memory 120 and the storage 130). Even a strong attacker who can replace the outside of the EPC 121 may not directly obtain or damage the data in the EPC and may be unfree from being detected.

The performance of the security computer device may be reduced by a protection mechanism for the outside of the EPC 121. For example, in a security computer device according to a comparative embodiment, the SGX may compute a key hash MAC (HMAC) for each cache line, compose a modified version of the Merkle tree, and keep the root of the Merkle tree within CPU hardware to ensure the freshness of EPC stored outside the EPC 121. Each cache replacement operation may be accompanied by MAC verification using the Merkle tree. MCT verification using the Merkle tree may ensure that the EPC as a whole remains as written by the enclave. The freshness may indicate that the data is the latest version among a plurality of versions according to different points in time while satisfying integrity. The integrity may indicate that the data is written by an authorized person and that the processor can detect data modified or forged by an unauthorized person.

Encryption of the data outside the EPC 121 may restrict usage outside the EPC 121. For example, the confidentiality may require data in the memory to be encrypted, while the integrity may require MAC computation and verification. The cost of MAC may increase as the total amount of memory available to an enclave increases. Thus, using large memory as an enclave may be impossible. For example, the EPC 121 may typically have a capacity of 128 MB or 256 MB depending on the choice of design and implementation.

An enclave may use memory beyond the capacity of the EPC 121, but the pages that do not fit in the EPC 121 must be paged out of the EPC 121 with similar cryptographic protection. Also, applications may access pages in the memory only if the pages are loaded into the EPC. For example, for real-world applications that need an EPC with a much larger capacity, SGX provides EPC paging, but the cost of encryption and MAC verification may increase even when EPC paging is used. Consequently, an application requiring an EPC with a large capacity that is not tailored may suffer from significant performance overhead. Therefore, applications must be carefully redesigned to minimize EPC paging and may have to store large data chunks with manual protection.

When the system call overhead increases, the performance of the security computer device may decrease. An enclave may run as part of a user process as a separated execution context. An additional context switch may be required to invoke system calls from the separated execution context. Therefore, most applications running on an enclave may adopt asynchronous system calls as a major performance optimization mechanism. Here, an application may generate a thread that stays in the user's context with the role of mediating system calls from the enclave. As described above, the security computer device according to an embodiment (TWEEZER) may also adopt asynchronous system calls by running on SCONE.

Figure 2:
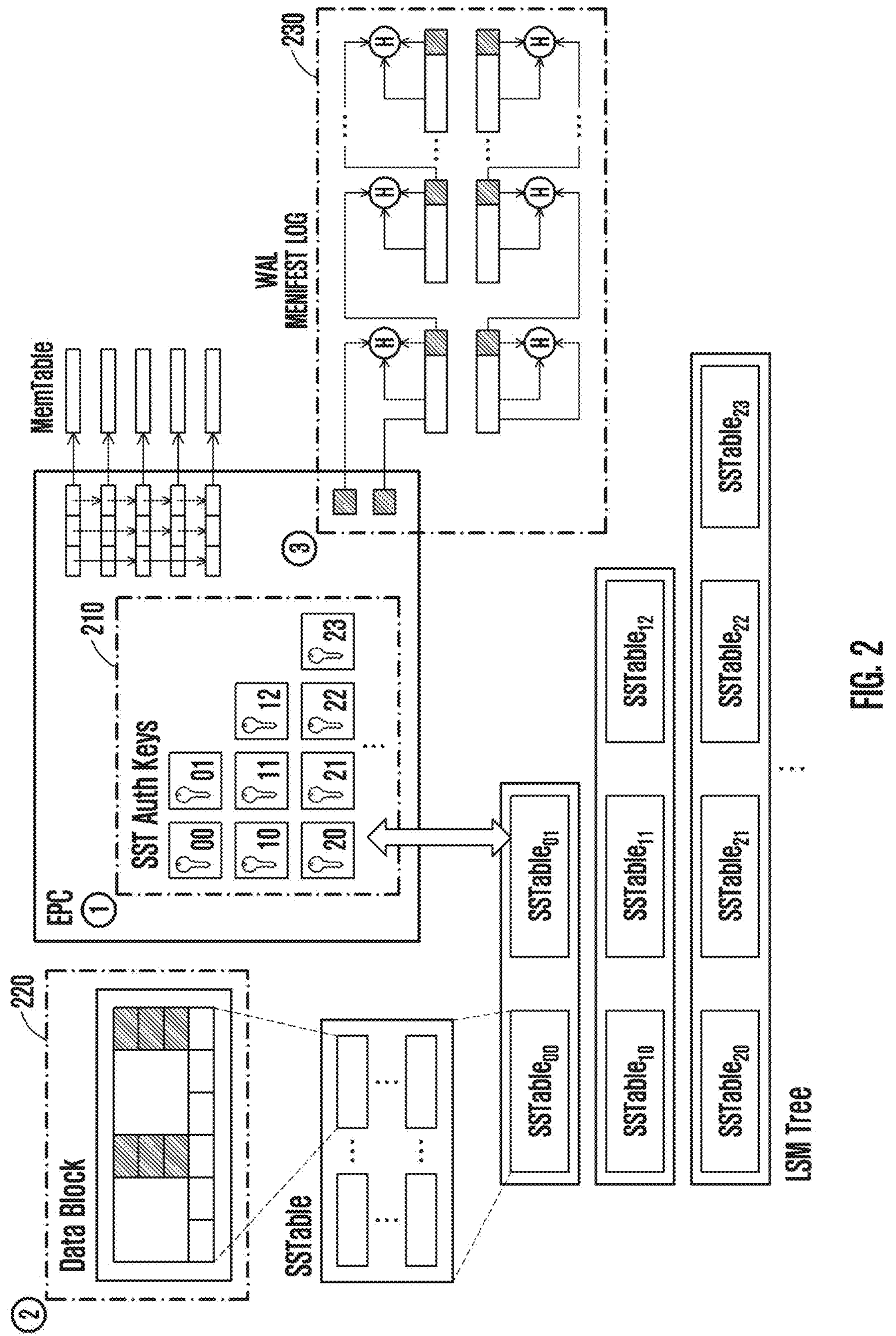
FIG. 2 illustrates a security computer device according to an embodiment.

FIG. 2 illustrates a security computer device according to an embodiment.

A security computer device according to an embodiment may use a persistent key-value store (KVS). A key-value store may be a type of NoSQL database, and may represent a system that manages values being data corresponding to an object key value among nonrelational database management systems for big data processing. The persistent KVS may have large memory usage to process a large (e.g., more than tens of gigabytes) amount of data. For a persistent KVS to be protected through hardware-based confidential computing, it may need to be tailored considering the EPC limitations described above with reference to FIG. 1.

Persistent KVSs may use the log-structured merge-tree (LSM tree) for data in non-volatile memory (e.g., a storage, the storage 130 of FIG. 1), accompanied by in-memory caches and write-ahead logs (WAL). The LSM tree and WAL must be manually protected with encryption and MAC.

For example, a persistent KVS according to an embodiment may run on a RocksDB platform which is suitable for the same big data processing and has high performance in fast flash storage devices. RocksDB is an open-source persistent KVS that is widely used in production, may run on various environments such as memory, flash, hard disks, and HDFS, and may be based on Level DB which is an open-source project. RocksDB may use an LSM tree as a data structure for key-value pairs of non-volatile memory (e.g., a storage).

The LSM may be a BaseTree algorithm used in KVSs such as LevelDB, RocksDB, and Hbase, may be a data structure designed for write-intensive data workloads, and may maintain a low write latency.

For example, the LSM tree where data is managed hierarchically may flush to non-volatile memory (e.g., a storage) only when volatile memory is full, thus achieving a low write latency. For a low write latency, the LSM tree may prevent access to deleted data using Tombstone entries that mark deleted data entries separately, rather than updating or not deleting data.

Data stored in non-volatile memory may be deleted by a merge operation between levels of the LSM tree. When the size of data stored in TreeComponent between levels is greater than or equal to a preset threshold, the LSM tree may merge the upper-level tree component into the lower-level tree component, thereby deleting data stored in the actual tree components. RocksDB may use compaction corresponding to merging between levels in the LSM tree and a Bloom filter to improve read performance.

The four critical components of RocksDB may include MemTable, SSTable, write-ahead log (WAL), and MANIFEST log.

The MemTable may reside in volatile memory (e.g., the memory 120 of FIG. 1). The MemTable may store recently added key-value pairs using a skip list for fast lookup. A put operation may perform an operation of filling the MemTable before data is flushed to non-volatile memory (e.g., the storage 130 of FIG. 1, which is also referred to as a persistent medium). If the size of the MemTable becomes larger than a configurable threshold, the processor may mark the MemTable as immutable and generate a new MemTable to serve the following writes. In RocksDB, the processor may trigger a background flush thread to move the MemTable marked as immutable (e.g., the immutable MemTable) to the non-volatile memory in the form of an SSTable. Since the MemTable is relatively large by default (e.g., 64 MB), the MemTable may need to be tailored to employ an EPC efficiently.

The new SSTables may be generated from a series of MemTables and constitute Level 0 of the LSM tree. A new read request (also referred to as a lookup request) for an object key may need to look up all of the SSTables in Level 0 because any SSTable could contain an object key. Thus, in RocksDB, the number of SSTables in Level 0 may need to be maintained. When the number of SSTables in Level 0 exceeds a configurable threshold, the processor may trigger an operation called compaction. A compaction thread running in the background may select several SSTables in a target level (e.g., Level 0), delete duplicated object keys, and compact the SSTables to generate a new SSTable stored in the subsequent level (e.g., Level 1) of the LSM tree of the storage. Through the compaction operation, an object key may appear at each level except for Level 0 at most once, and all SSTables may be sorted. Through the sorted SSTables, the processor may look up at most one SSTable per level to find a key-value pair corresponding to the object key in the KVS.

One SSTable may include index blocks and data blocks. The index key sequence of an index block may be sorted. For example, an i-th index key of the index key sequence may be larger than object keys in an i-th data block and smaller than object keys in an (i+1)-th data block. At the end of an SSTable may be a footer block containing padding to align the SSTables and a magic number marking the end of an SSTable. In a security computer device (Speicher) according to a comparative embodiment, the processor may store the MACs of key-value pairs of the SSTable in the footer block. The MACs of key-value pairs of the SSTable may result in increased EPC usage when the KVS becomes large. As described later, the security computer device according to an embodiment may compute and store a MAC for each key-value pair.

Herein, an attacker to the security computer device may acquire complete control of a system running the security computer device, except for the context (e.g., data) of the enclave. For example, an attacker may obtain such control by exploiting a known vulnerability in the system of a cloud provider or as an insider responsible for maintaining the system of the cloud provider. In particular, the attacker may read or modify data in volatile memory (e.g., the partial memory 123 of the memory 120 of FIG. 1) or non-volatile memory (e.g., the storage 131 of FIG. 1), except for those in EPC (e.g., (e.g., the EPC 121 of the memory 120 of FIG. 1). However, the attacker may not directly query the KVS because the processor does not accept the attacker as an allowed client.

For reference, the design and implementation of an authentication protocol is a well-studied issue and may be applied independently of the design of the security computer device. Proposing a new remedy to address implementation bugs that the current implementation of Intel SGX may potentially nullify its security guarantee completely, and these implementation bugs are not fundamental flaws in its security model and will be fixed in future releases and thus, may not be targeted.

The security computer device according to an embodiment may use a permanent KVS. The security computer device may perform all operations that persistent KVSs usually implement as an extension of RocksDB. The only additional requirement for users may include retrieving and keeping a pair of encryption key and authentication key and placing heartbeat transactions. The heartbeat transactions are timestamps for the KVS version and may be used to verify that a snapshot of the security computer device (TWEEZER) according to an embodiment is the latest one. The security computer device according to an embodiment may require the pair of encryption key and authentication key to recover its data in case of a crash, and the heartbeat transactions may provide rollback resilience.

The security computer device according to an embodiment may include configurations according to three additional design decisions to achieve higher EPC efficiency and shorter MAC verification latency.

As shown in authentication keys stored in an EPC of FIG. 2 (represented as SST Auth Keys 210 in FIG. 2), the security computer device according to an embodiment may generate a unique authentication key for an SSTable and map the authentication key to the SSTable. The processor of the security computer device may compute the MAC to be stored along with the data each time when storing data in the non-volatile memory (e.g., the storage 130 of FIG. 1). As described later, the MAC stored in the non-volatile memory may be used to verify the integrity of the value of the key-value pair.

When the size of the LSM tree having key-value pairs is large, the cost of computing the MAC may be considerable. The security computer device according to a comparative embodiment may build a Merkle tree at the cost of potentially long latency to ensure the freshness of a large LSM tree. On the contrary, the security computer device according to an embodiment may use three properties of LSM trees to avoid composing the Merkle tree spanning the entire LSM tree. The three properties of LSM trees may include the immutability of each SSTable, the uniqueness of a key in each level, and the sorted keys in each data block. The security computer device according to an embodiment may map, for each SSTable, a unique authentication key (e.g., a MAC key) to an SSTable.

As shown in a data block of the SSTable of the LSM tree stored in the non-volatile memory of FIG. 2 (represented as a data block 220 in FIG. 2), the security computer device according to an embodiment may associate a MAC with each key-value pair rather than with each data block in an SSTable. The processor may use the data block as a natural unit for encrypting and computing the MAC. The SSTables are supposed to reside in non-volatile memory optimized for block-level access, and in RocksDB, the security computer device according to an embodiment may fetch and cache the key-value pairs using granularity. Granularity may indicate that a MAC is associated with one of key-value pairs of the data block, rather than the entire data block.

The security computer device according to a comparative embodiment may compute and store a MAC according to a data block. To guarantee the security of the data block, the data block must reside in the EPC while being accessed, consuming EPC space. A significant performance cost may not be incurred when the KVS serves a relatively small data set and is configured to have only a small block cache. However, when the KVS requires a larger block cache to accommodate more data, the blocks in EPC may quickly become a performance bottleneck, which may quickly exhaust the EPC space. On the contrary, the security computer device according to an embodiment may reduce read amplification in EPC usage by encrypting and authenticating each key-value pair separately.

Therefore, the security computer device (TWEEZER) according to an embodiment may save EPC space and use the outside of the EPC more effectively as a cache for SSTables.

As shown in the WAL and MANIFEST log of FIG. 2 (represented as a WAL and MANIFEST LOG 230 in FIG. 2), the security computer device according to an embodiment may use hash chains without using trusted counters. The WAL may be stored in the non-volatile memory to recover recently updated key-value pairs after a crash, as a critical piece of data for the performance of persistent KVSs. The logs may need to be protected with encryption and MAC because the logs are supposed to reside in non-volatile memory for persistence. Appropriate encryption and MAC computation may provide confidentiality and integrity guarantees, but each log entry may be associated with additional data for freshness. The security computer device (Speicher) according to a comparative embodiment may use trusted counters. In contrast, the security computer device (TWEEZER) according to an embodiment may construct a hash chain to protect the content and the order of the logs. The security computer device (TWEEZER) according to an embodiment may not prevent the rollback attack with the hash chain only and thus, may place heartbeat transactions. The heartbeat transactions are timestamps for the KVS version and may be used to verify that a snapshot of the security computer device (TWEEZER) according to an embodiment is the latest one.

The security computer device (TWEEZER) according to an embodiment may ensure the integrity and freshness of the WAL and MANIFEST log using the classic hash chain. The WAL and MANIFEST log may both be append-only lists. The freshness verification may be performed only upon recovery, the hash chain may be a good fit to protect the WAL and MANIFEST log. When starting to run either from an empty KVS or after recovery, the security computer device (TWEEZER) according to an embodiment may generate a nonce, consider the nonce as a first MAC M0, and generate an encryption key for MAC computation. For each new log entry $e_i$, the security computer device (TWEEZER)

according to an embodiment may concatenate encrypted data with a previous log $M_{i-1}||E(e_i)$ to compute the subsequent MAC $M_i$, and store the same along with the encrypted data. The encrypted key-value pair may become a data entry for the WAL, and the encrypted new MANIFEST may become a data entry for the MANIFEST log. Hash chaining may sufficiently prevent any attack on the integrity and freshness of the hash chain.

The hash chain used for log protection may be chosen instead of the mechanism of the security computer device (Speicher) according to a comparative embodiment that relies on the trusted counter for two reasons. First, the trusted counter that the security computer device (Speicher) according to a comparative embodiment relies on may increment only once every 60 milliseconds (ms). The number of new log entries the KVS may generate outside the EPC may be limited to one per 60 ms (e.g., about 23.4 per second). The number of new log entries may be much lower than the expected number of write requests that a KVS is expected to serve. The cryptographic computer device according to a comparative embodiment may inevitably delay persisting new key-value pairs. In contrast, the hash chain mechanism may not suffer from this limitation. Second, support for the trusted counter on server platforms is not yet stable and its availability may vary depending on the system configuration. SGX may be designed to use the trusted counter provided by the accompanying Trusted Platform Module, but not all server platforms may have the trusted counter.

The API may be protected as well. Therefore, the approach of the security computer device according to an embodiment using the hash chain may be a more portable method to protect the logs.

The security computer device (TWEEZER) according to an embodiment may bind the confidentiality and integrity of data to a pair of encryption key and authentication key and a MAC computed from the MANIFEST. The security computer device (TWEEZER) according to an embodiment may retain the pair of encryption key and authentication key securely (e.g., in a physically isolated local machine) for full protection. The security computer device (TWEEZER) according to an embodiment may use the encryption key and the MAC to recover data from the encrypted backup and to verify the freshness of the backup. While running, the security computer device (TWEEZER) according to an embodiment may use the pair of encryption key and the authentication key to encrypt and authenticate the MANIFEST log that contains the KVS metadata. The other encryption key and authentication key that the security computer device (TWEEZER) according to an embodiment uses may be kept within the MANIFEST on a persistent storage, residing in the EPC during run time. The security computer device (TWEEZER) according to an embodiment may use the keys without significant delay and may later obtain a copy of the pair of encryption key and authentication key from the pair of encryption key and authentication key and the MANIFEST log file when loading the data from a snapshot.

The security computer device (TWEEZER) according to an embodiment may encrypt all data that are stored outside the EPC and decrypt the data only within the EPC to protect the confidentiality of the data. For example, the data of the SSTable of the log-structured merge-tree stored in the storage may remain encrypted in both the volatile memory (e.g., the partial memory 123 of FIG. 1) and the non-volatile memory (e.g., the storage 130 of FIG. 1) distinct from the EPC, and the processor may decrypt the data of the SSTable only within the EPC when obtaining a key-value pair from the SSTable. The processor may, for example, use an AES GCM mode with a 256-bit key as the encryption scheme.

Hereinafter, a method of ensuring freshness with the authentication scheme tailored for LSM trees by the security computer device (TWEEZER) according to an embodiment will be described.

The security computer device (TWEEZER) according to an embodiment may compute the HMAC of SSTables to verify freshness. When the security computer device (TWEEZER) generates a new SSTable in the process of compaction or flush, the security computer device (TWEEZER) may generate a new authentication key that is used exclusively for the generated new SSTable. The security computer device may store the generated new authentication key in the EPC and the MANIFEST. The processor may compute a MAC for each key-value pair in the new SSTable. The processor may store the computed MAC along with the encrypted data in the non-volatile memory.

As described later with reference to FIG. 4, when the processor reads a target table (e.g., the SSTable) to look up a key-value pair, the processor may obtain a target authentication key mapped to the target table among authentication keys for a plurality of SSTables stored in the EPC. The processor may verify the integrity by comparing a comparative MAC computed using the obtained target authentication key and a reference MAC stored in the target table.

The security computer device according to an embodiment may use the authentication key mapped to the SSTable and invariant checks to guarantee the freshness of key-value pairs based on the MAC. The processor may require the authentication key mapped to the SSTable stored in the EPC to compute the same MAC. An attacker may not access the authentication key stored in the EPC and thus, may be difficult to generate a correct MAC with respect to the key-value pair.

An attacker may obtain pairs of data and MAC and replay the obtained pairs. The security computer device according to a comparative embodiment may use a single authentication key to generate MACs for multiple SSTables $SST_0, \ldots, SST_n$. For the security computer device according to a comparative embodiment, the attacker may obtain pairs of SSTables and corresponding MACs $(SST_0, MAC_0), \ldots, (SST_n, MAC_n)$ and present one of the pairs of SSTables and MACs to bypass the verification. The security computer device according to a comparative embodiment may accept the replayed pair because the MAC computed based on the authentication key matches the MAC presented by the attacker. To not accept the replayed pair, the security computer device according to a comparative embodiment may need to use an additional means to detect the replay (e.g., a Merkle tree).

In contrast, the security computer device (TWEEZER) according to an embodiment may use the uniqueness of the authentication key mapped to each SSTable and the immutability of the SSTable to guarantee the freshness. The security computer device may not need to compose a Merkle tree spanning across all SSTables. The processor may use distinct authentication keys to prevent the replays across the set of data authenticated with different keys. However, it may be difficult to prevent the replays within the data sharing one key because the attacker may have multiple pieces of data to potentially switch or replay. In particular, the attacker may reuse an older version of the data chunk (e.g., temporal replay) or reuse the data chunks authenticated with the same key (e.g., spatial replay).

The security computer device (TWEEZER) according to an embodiment may prevent temporal replay against each SSTable by taking advantage of the immutability of the SSTable. The processor may not modify the SSTable for updating a key-value pair in an LSM tree. Instead, the processor may store the updated key-value pair in an SSTable at a lower level than the level of the SSTable of the existing key-value pair. The processor may store the existing key-value pair and the updated key-value pair in different SStables. Since the existing key-value pair and the updated key-value pair can be authenticated based on different authentication keys, the processor may not use the existing key-value pair to roll back the update. To roll back the update of the key-value pair, the MAC for the existing key-value pair may be requested based on the authentication key mapped to the SSTable of the updated key-value pair. However, since the security computer device according to an embodiment has never computed the MAC for the existing key-value pair based on the authentication key mapped to the SSTable of the updated key-value pair, the attacker may not have the MAC.

The performance improvement of the security computer device according to an embodiment may come from the lower EPC usage of Merkle tree-less authentication.

The security computer device (Speicher) according to a comparative embodiment may store the MAC in the footer block of each SSTable that is kept within memory, within the EPC when it runs in an enclave (e.g., on Scone).

If the security computer device according to a comparative embodiment computes MACs along the Merkle tree each time when reading an SSTable from the non-volatile memory, the read latency may significantly increase considering the cost of HMAC computation of the SSTable. Therefore, the security computer device according to a comparative embodiment may perform MAC caching particularly for the large size of the LSM tree.

To avoid a series of MAC computations along the Merkle tree for every SSTable read, the security computer device according to a comparative embodiment may need to cache the MAC for each data block within the EPC. In the security computer device according to a comparative embodiment, the cost of caching the AMC in the EPC may remain small for a small number of SSTables, but may increase quickly as the number of SSTables increases. The additional EPC usage for each SSTable may vary depending on the configuration, but may be about 840 KB for each 64-MB SSTable, when the data block size is 4 KB and the value size is 128 B. The additional EPC usage may be roughly a total of 840 MB if the security computer device according to a comparative embodiment contains 64 GB of key-value pairs, even assuming that it has no duplicates. The additional EPC usage of the security computer device according to a comparative embodiment may cause a significant overhead considering the size of EPC, which is either 128 MB or 256 MB.

As described later with reference to FIG. 12, an authentication key mapped to each SSTable may prevent the security computer device from storing too much data in the EPC when serving a large KVS.

Figure 3:
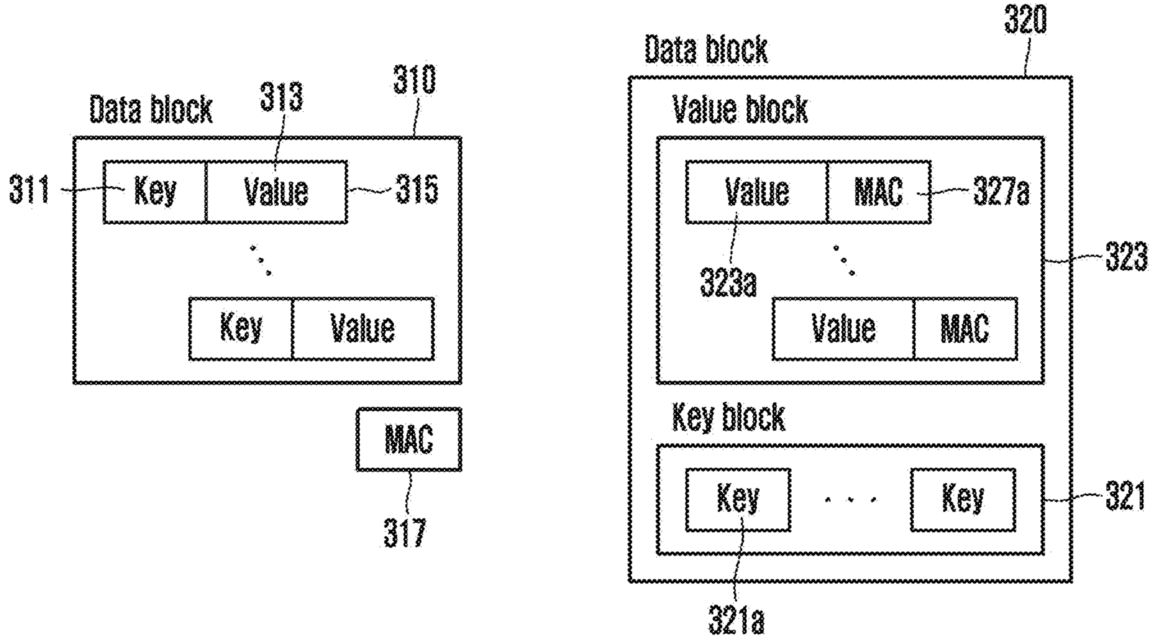
FIG. 3 illustrates a data block according to an embodiment and a data block according to a comparative embodiment.

FIG. 3 illustrates a data block according to an embodiment and a data block according to a comparative embodiment.

The security computer device (TWEEZER) according to an embodiment may authenticate each key-value pair individually to voice read amplification. As described above in (2) of FIG. 2, an SSTable may include a plurality of data blocks typically containing 3 to 28 key-value pairs. The data blocks included in the SSTable may be a design choice considering the storage devices optimized for burst data transfers.

The security computer device (Speicher) according to a comparative embodiment may use a data block 310 as the unit of encryption and authentication. As shown in the data block 310 of FIG. 3, the security computer device (Speicher) according to a comparative embodiment may compute one MAC 317 for the data block 310 and store the result in the footer block of the SSTable. The encryption and authentication cost may make the inherent read amplification more expensive because the security computer device according to a comparative embodiment needs to compute the MAC for the entire data block even when reading only one key-value pair. In addition, the security computer device according to a comparative embodiment may cause the verified data block to reside in the EPC to prevent repeating the expensive verification on the verified data block, consuming invaluable EPC. In the security computer device according to a comparative embodiment, the data block-level decryption and authentication may limit the potential location of the block cache to the EPC, and this may cause a scalability bottleneck when large data is stored.

In contrast, as shown in a data block 320 of FIG. 3, the data block 320 of the security computer device (TWEEZER) according to an embodiment may be rearranged for fine-grained encryption and authentication. The data block 320 may include a key block 321 and a value block 323. The value block 323 may be a block for the values of key-value pairs and include all values (e.g., values 323*a*) in the data block 320 along with MACs (e.g., MACs 327*a*) computed from the values and object keys corresponding to the values. The key block 321 may be a block for object keys of the key-value pairs and include the sequence of object keys along with the offsets of the values in the value block 323. The restructuring of the data block 320 according to an embodiment may have two benefits. First, the security computer device (TWEEZER) according to an embodiment may not need to verify the freshness of the entire data block to obtain a single key-value pair, reducing read latency. Second, the security computer device (TWEEZER) according to an embodiment may place the block cache in the volatile memory (e.g., the partial memory 123 of FIG. 1), which is distinct from the EPC and free from size limitations, because the security computer device may directly read a single key-value pair from an encrypted data block.

The security computer device (TWEEZER) according to an embodiment may utilize the invariant order of the LSM tree to verify the freshness of the key-value pairs. Each data block in an SSTable of RocksDB may include a sequence of ordered key-value pairs, and so may be the object keys in the key block 321 of the security computer device (TWEEZER) according to an embodiment.

The security computer device (TWEEZER) according to an embodiment may read a data block in the SSTable when the security computer device fails to retrieve the key in the MemTable or the SSTables at higher levels. The security computer device (TWEEZER) according to an embodiment may firstly consult the index blocks kept within the EPC in plain text. By RocksDB design, each data block $B_i$ in the LSM tree may be associated with an index key $k_i$ in the index block. The object keys in a data block $B_i$ may not be smaller than its index key $k_i$ and not be larger than the index key $k_i+1$ of the subsequent data block $B_i+1$. Utilizing this, the security computer device (TWEEZER) according to an embodiment may perform a binary search on the index keys to obtain the data block potentially containing the object key the security computer device is looking for.

Algorithm 1 shows verifying the order of a key block according to an embodiment.

```
Algorithm 1 Key Ordering

    Input: i — The index of data block
    Output: Returns true if the data block satisfies invariant.
 1: procedure CHECKORDERING(i)
 2:   keyBlock = GetKeyBlock(i)
 3:   firstKey = keyBlock.head
 4:   lastKey = keyBlock.tail
 5:   keyLowerBd = GetIndexKey(i)       ▹ Obtain index key in EPC
 6:   keyUpperBd = GetIndexKey(i + 1)
 7:   ret = true
 8:   if firstKey < keyLowerBound then
 9:     ret = false
10:   if lastKey ≥ keyUpperBound then
11:     ret = false
12:   for j in 1...keyBlock.length − 2 do
13:           ▹ for each key in the key block except the first and last
14:     if keyBlock[j − 1] ≥ keyBlock[j] then
15:       ret = false
16:     else if keyBlock[j] ≥ keyBlock[j + 1] then
17:       ret = false
18:     else
19:       continue
20:   return ret
```

To retrieve the object key from the obtained data block, the security computer device (TWEEZER) according to an embodiment may decrypt and verify the order of the key block in the data block, before looking for the object key. If the object key is retrieved, the processor of the security computer device (TWEEZER) according to an embodiment may use the offset associated with the key to obtain the encrypted value with the MAC. The processor may compute the MAC using the authentication key of the SSTable, the queried object key, and the value. By comparing the computed MAC with the stored MAC, the processor may verify the freshness of the key-value pair.

If the processor fails to retrieve the object key, the processor may determine that the object key does not exist in the level and move on to the subsequent level. Although the processor does not perform MAC-based authentication for the key block, the order verification (e.g., the order check according to Algorithm 1) may effectively mitigate any fault attack to deceive the processor that an object key does not exist in a data block.

As described above, all object keys in a data block may need to be larger than the index key of the data block and smaller than the index key of the subsequent block. The processor may check this invariant by comparing the first and last object keys of a key block with the index keys, in lines 3 to 7 of Algorithm 1. The processor may compare each object key in the key block with the neighboring keys, in lines 13 to 21 of Algorithm 1, to ensure the order within the key block. As a result, any attempt to inject a fault into a key block will make the processor interpret the key block as a different list of keys, making the list highly unlikely to satisfy the order invariant. The probability of a successful attack may be very low. In detail, when the processor uses b-byte object keys and the difference between the two index keys is D, the chance of a successful attack may be roughly as small as $$\frac{D}{2^{8\times b}}.$$

For example, when D is $2^{64}$ and b is 16, the probability of a successful attack may be about $5.42\cdot10^{-20}$ (or about $2^{-64}$). Thanks to this invariant-based freshness protection, the cost of reading a key-value pair may be as small as one decryption of a key block, one decryption of a value entry, and one MAC computation of a key-value pair. The security computer device according to an embodiment may have a cost that is roughly 10 times smaller than the potential cost of a data block-level authentication scheme when a block contains 10 key-value pairs because the MAC operation dominates read performance.

The security computer device (TWEEZER) according to an embodiment may place the block cache outside the EPC, distinct from the EPC, through fine-grained encryption and authentication. The untrusted block cache placed outside the EPC may be beneficial when large data is stored in the LSM tree.

The security computer device according to a comparative embodiment may place the block caches inside the EPC and leave the block caches in the EPC as well because the loaded block is not encrypted. Leaving the block caches in the EPC may not cause a performance bottleneck when a small amount of data is stored in the LSM tree. However, RocksDB is often configured to have a large block cache in production to serve a large amount of data, and the block cache within the EPC may not scale under this condition. The block caches may still be placed outside the EPC, distinct from the EPC, but the block cache hit latency may significantly increase because every single cache hit triggers a decryption and verification of the whole data block.

In contrast, the fine-grained encryption and authentication approach that the security computer device (TWEEZER) according to an embodiment takes may include taking only a small portion of data into the EPC from the block that resides in the untrusted outside of the EPC, distinct from the EPC.

Hereinafter, an insertion operation, lookup operation, and range operation of a key-value pair by the security computer device according to an embodiment will be described.

First, the insertion operation (also referred to as a put operation) of a key-value pair by the security computer device according to an embodiment is described.

The security computer device (TWEEZER) according to an embodiment may handle an insertion request (also referred to as a put request) by inserting the key-value pair to WAL for persistence and to MemTable for efficient lookup. The processor may first encrypt the new key-value pair with the dedicated log key. The processor may use the encrypted key-value pair to compute a MAC for the key-value pair along with the MAC of the previous entry in WAL. The processor may store the encrypted key-value pair in WAL along with the computed MAC.

The processor according to an embodiment may follow a procedure similar to that of RocksDB when the processor inserts a key-value pair to the MemTable, except for the cryptographic operations. For example, the processor may store the MemTable in both the EPC (e.g., the EPC 121 of FIG. 1) and untrusted volatile memory (e.g., the partial memory 123 of FIG. 1). The processor may find out the place in the untrusted volatile memory where the value of the new key-value pair will be stored using the internal nodes in the EPC and store the encrypted value on the found place in the untrusted volatile memory. The processor may keep the MAC for the newly stored value within the EPC for integrity verification.

Figure 4:
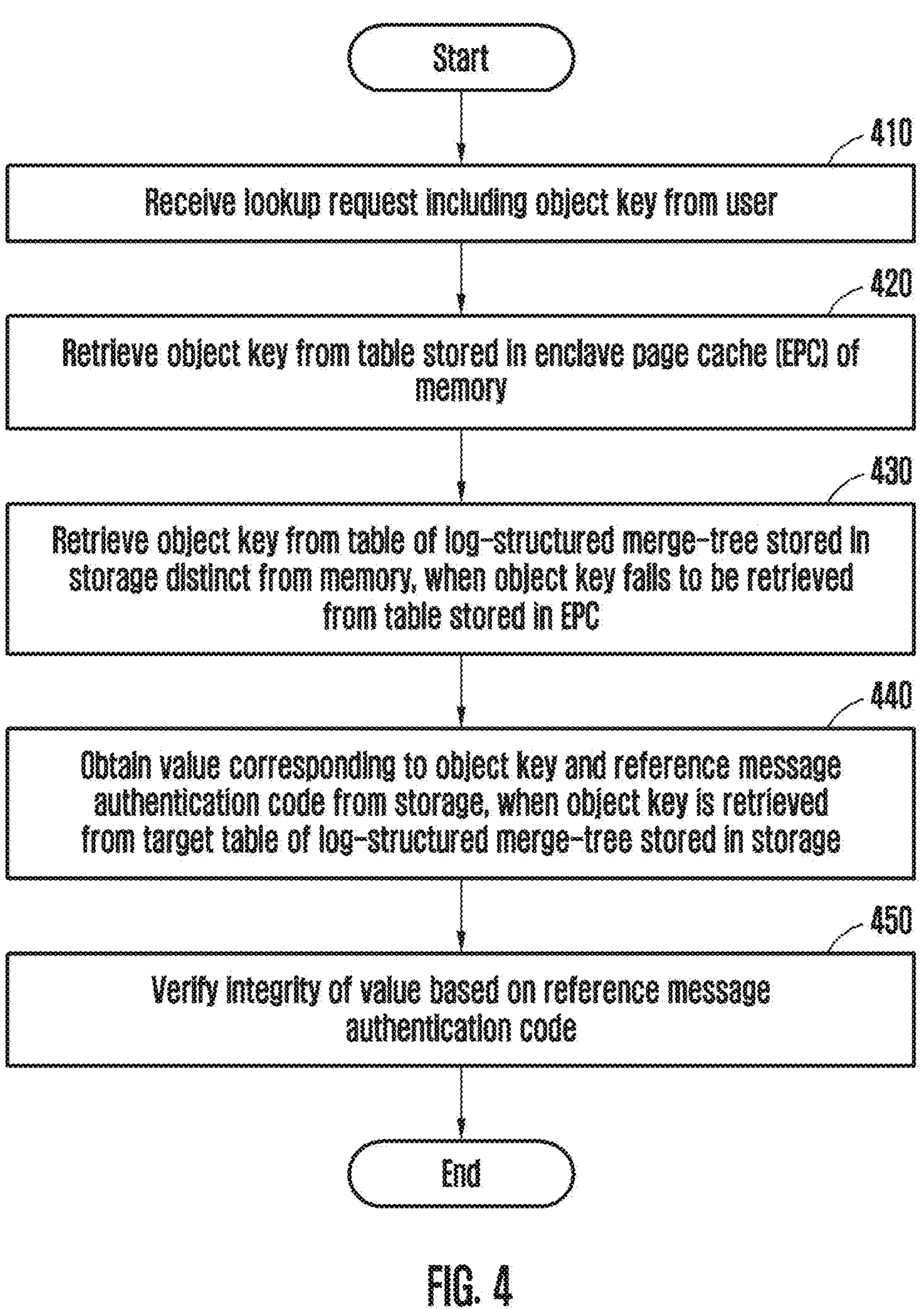
FIG. 4 is a flowchart illustrating a lookup operation, when an object key is retrieved from an enclave page cache (EPC), performed by a processor according to an embodiment.

FIG. 4 is a flowchart illustrating a lookup operation, when an object key is retrieved from an EPC, performed by a processor according to an embodiment. Hereinafter, the lookup operation when an object key is retrieved in the EPC according to an embodiment is described with reference to FIG. 4.

In operation 410, the processor may receive a lookup request (also referred to as a get request) including an object key from a user. The lookup request including the object key may be a request for returning the value of a key-value pair having the object key to the memory and storage of the security computer device. In response to the lookup request including the object key, the processor may return the value corresponding to the object key when the object key is retrieved in the memory and storage of the security computer device, and return data indicating that the object key fails to be retrieved when the object key fails to be retrieved.

In operation 420, the processor may retrieve the object key from a table stored in the EPC of the memory. The EPC (e.g., the EPC 121 of FIG. 1) may include a part of the volatile memory (e.g., the memory 120 of FIG. 1). The processor may retrieve the object key included in the lookup request, among object keys in the MemTable of the EPC. The lookup operation when the object key is retrieved in the table stored in the EPC will be described later with reference to FIG. 5.

In operation 430, the processor may retrieve the object key from a table of a log-structured merge-tree stored in the storage, when the object key fails to be retrieved from the table stored in the EPC. The processor may retrieve the object key from the table (e.g., an SSTable) of the log-structured merge-tree stored in the non-volatile memory. The processor may traverse the LSM tree to retrieve the key-value pair with the requested object key from the LSM tree or determine that the requested object key does not exist in the LSM tree.

The processor according to an embodiment may initiate the retrieval of the object key, starting from the lowest level of the log-structured merge-tree stored in the storage. The processor may re-retrieve the object key from a level subsequent to the level at which the retrieval of the object key is being performed, when the object key fails to be retrieved at the level at which the retrieval of the object key is being performed. The processor may terminate the retrieval of the object key, when the object key is retrieved at the level at which the retrieval of the object key is being performed.

The processor may search a target table of the LSM tree, from the lowest-level table to the highest-level table of the LSM tree. The target table may be a table of the LSM tree having the possibility of including the requested object key. The processor may retrieve the requested object key from the target table of the LSM tree.

For example, the processor may determine a target data block having the possibility of including the object key, among a plurality of data blocks of the target table. The processor may determine the target data block based on an index block of the target table. The index block of the target table may indicate the range of an object key included in the plurality of data blocks of the target table.

The processor may obtain an encrypted key block of the target data block from the storage. The processor may decrypt the obtained key block in the EPC. The processor may verify the order of the key block with respect to the decrypted key block. The key block of the target data block may have object keys of a plurality of key-value pairs. As described above, the object keys of the key block may be stored in a sorted state. The processor may verify the order of the key block by checking the order of the object keys of the key block. For example, if the object keys of the key block are sorted in ascending order, the order of the key block may be verified. As another example, if the object keys of the key block are not sorted in ascending order, the order of the key block may not be verified.

If the order of the key block of the target data block is not verified, the processor may determine that the integrity of the target data block is not verified. For example, when the object keys of the key block are not sorted, the processor may detect an attack (e.g., spatial replay) on the key block of the target data block.

If the order of the key block of the target data block is verified, the processor may retrieve the object key from the key block. If the object key fails to be retrieved from the key block of the target data block, the processor may re-retrieve the object key by changing the target table to a table of a subsequent level of the target table.

In operation 440, the processor may obtain a value corresponding to the object key and a reference message authentication code from the storage, when the object key is retrieved from the target table of the LSM tree stored in the storage. When the object key is retrieved from the key block of the target data block, the processor may obtain the value corresponding to the object key and the reference message authentication code from the value block of the target data block.

In operation 450, the processor may verify the integrity of the obtained value based on the reference message authentication code.

The processor may obtain, from the EPC, a target authentication key among authentication keys mapped to tables of the LSM tree. The target authentication key may be an authentication key mapped to the target table. As described above, each table of the LSM tree may be mapped to a unique authentication key, and the authentication key may be stored in the EPC. The processor may compute a comparative message authentication code using the target authentication key mapped to the target table, to verify the integrity of the value obtained from the value block of the target data block of the target table.

The processor may compute the comparative message authentication code based on the target authentication key and the value. As described above, the target authentication key may be obtained from the EPC, and the value may be obtained from the storage when the object key is retrieved from the target table of the LSM tree.

The processor may verify the integrity of the value by comparing the computed comparative message authentication code with the reference message authentication code. As described above, when the object key is retrieved from the target table of the LSM tree, the reference message authentication code may be obtained from the storage. The reference message authentication code may be obtained from the value block of the target data block of the target table of the LSM tree of the storage. When the comparative message authentication code and the reference message authentication code match, the integrity of the value may be verified, and when the comparative message authentication code and the reference message authentication code do not match, the integrity of the value may not be verified.

The processor may respond to the lookup request with the value when the integrity of the value is verified. For example, the processor may transmit the value of which the integrity is verified to the user. When the integrity of the value is not verified, the processor may transmit data indicating that the integrity of the value is not verified, for the lookup request.

Figure 5:
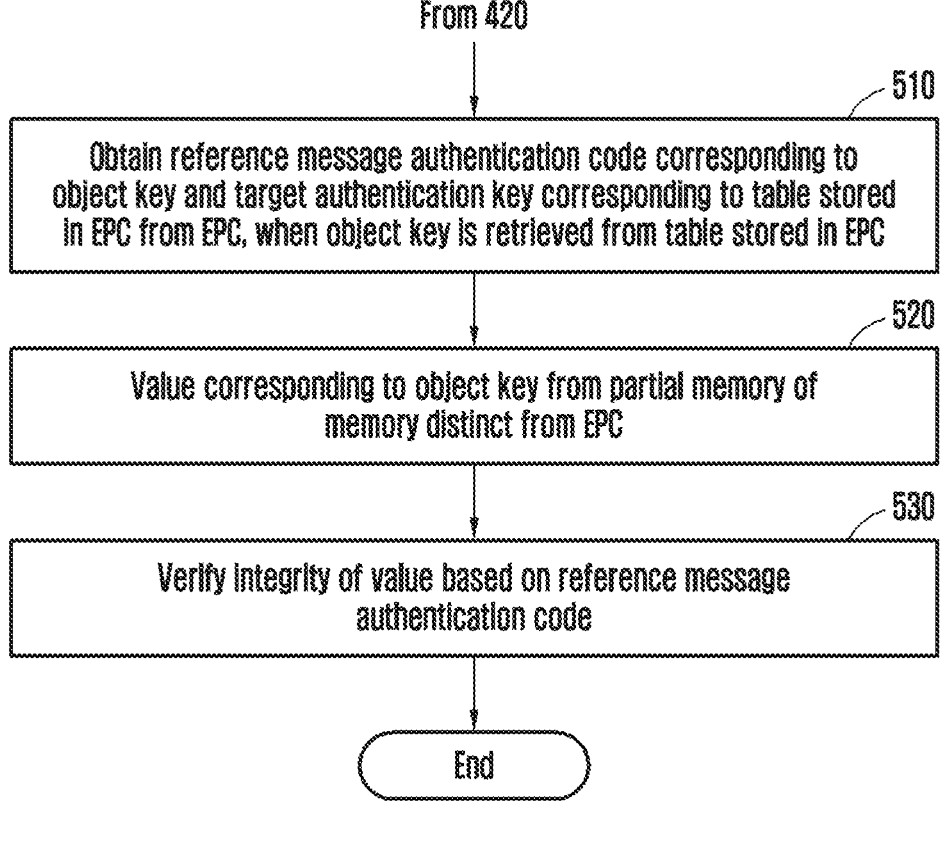
FIG. 5 is a flowchart illustrating a lookup operation, when an object key is retrieved from non-volatile memory, performed by a processor according to an embodiment.

FIG. 5 is a flowchart illustrating a lookup operation, when an object key is retrieved from non-volatile memory, performed by a processor according to an embodiment. Hereinafter, the lookup operation when the object key is retrieved from the non-volatile memory according to an embodiment is described with reference to FIG. 5.

As described above with reference to FIG. 4, in operation 420, the processor may retrieve the object key from the table stored in the EPC of the memory.

In operation 510, the processor may obtain the reference message authentication code and the target authentication key from the EPC when the object key is retrieved from the table stored in the EPC. When the object key is retrieved from the table stored in the EPC, a message authentication code corresponding to the object key may be obtained from the EPC. The target authentication key may be obtained from the EPC, as an authentication key mapped to the table (e.g., MemTable) stored in the EPC when the object key is retrieved from the table stored in the EPC.

In operation 520, the processor may obtain the value from a partial memory of the memory. The processor may obtain the value corresponding to the object key from the partial memory when the object key is retrieved from the stable stored in the EPC.

In operation 530, the processor may verify the integrity of the value based on the reference message authentication code.

The processor may compute the comparative message authentication code based on the target authentication key and the value. As described above, the target authentication key may be obtained from the EPC, and the value may be obtained from the partial memory of the memory when the object key is retrieved from the table stored in the EPC.

The processor may verify the integrity of the value by comparing the computed comparative message authentication code with the reference message authentication code. As described above, when the object key is retrieved from the table stored in the EPC, the reference message authentication code may be obtained from the EPC. When the comparative message authentication code and the reference message authentication code match, the integrity of the value may be verified, and when the comparative message authentication code and the reference message authentication code do not match, the integrity of the value may not be verified.

The processor may respond to the lookup request with the value when the integrity of the value is verified. For example, the processor may transmit the value of which the integrity is verified to the user.

Last, the range operation by the security computer device according to an embodiment is described.

The processor according to an embodiment may receive a range request including the range of an object key.

The processor may generate iterators. The processor may handle the range query by traversing the data blocks in multiple levels through the iterators.

The processor may retrieve a starting object key. The processor may initialize the iterators on each level by performing the operations for handling the lookup request. For each traversal, the processor may determine the latest version of the key-value pair, by checking the MemTable stored in the EPC and then the LSM tree stored in the storage. When the object key is retrieved from the stable (MemTable) stored in the EPC, the processor may verify the integrity of the value and decrypt the value as the processor does to handle a lookup request. If the object key is retrieved from the LSM tree, the processor may handle a range query similarly even when the key-value pair is found, and the processor may verify the absence of an object key at a certain level as described above.

The processor according to an embodiment may follow the same recovery scheme that RocksDB implements. The recovery scheme described above may have additional decryption and verification using the pre-shared credentials (i.e., a pair of encryption key and authentication key and a MAC). For this, the processor may take the credentials as inputs in addition to the files constituting the KVS. The first piece of data that the processor decrypts and verifies may be the MANIFEST logs as described above. As a result, the processor may obtain the latest MANIFEST across the files and encryption keys needed to decrypt and verify the rest of the data chunks. In particular, the processor may obtain the encryption keys from the recovered and verified MANIFEST update log called version edit. Each version edit may contain the changes made to the KVS structure such as SSTable generation, SSTable deletion, log entry generation or log entry deletion. The processor may extend these records with additional secret keys that are used, such as the per-SSTable authentication keys or log encryption keys. Aside from the additional decryption or verification operations, recovery may be performed following the scheme of RocksDB. After recovery, the processor may provide the remote user with heartbeat data that represents the exact version of the snapshot.

Hereinafter, a method of ensuring the integrity and freshness of data against potential attacks by the security computer device according to an embodiment is described.

A replay attack is a common attack strategy against data integrity and may include the reuse of existing encrypted data-MAC pairs. As described above, an attacker may obtain data-MAC pairs stored outside the EPC, distinct from the EPC, because the attacker may have full access to the outside of the EPC (e.g., the partial memory 123 and the storage 130 of FIG. 1) distinct from the EPC the memory content outside the EPC as well as the storage content. The attacker may attempt a replay attack on data chunks (e.g., MANIFEST log, WAL, an SSTable, or individual key-value pairs).

The replay attack may include a log replay. The MANIFEST log and WAL may be protected by the hash chain. It may be assumed that a user has the pair of encryption key and authentication key for MAC computation along with the nonce used as the first hash by the security computer device according to an embodiment. When the processor according to an embodiment recovers from a snapshot, the processor may correctly determine if each log entry is a replayed block or not through the MAC verification for the following reason.

To replay the i-th block $b_i$ from the list of log entries $b_0, \ldots, b_n$ and pass the verification procedure, the attacker may need to generate or obtain MAC $M'_i$ computed from $h_{i-1}\|b'_i$ using the correct MAC key. Here, $b'_i$ denotes the replayed block, and $h_{i-1}$ denotes the correct MAC of an (i−1)-th block. However, the attacker may be unable to obtain such $M_i$ because of the uniqueness of the MAC key (or MAC authentication key) and the blocks in the log. The only data chunks with the corresponding MAC computed using the MAC key may be the log entries. Therefore, the attacker may select one block from $b_0, \ldots, b_n$ as $b'_i$. If the attacker selects $b_j$ as $b'_i$, the only MAC available to the attacker may be the MAC computed from $h_{j-1}\|b_j$, which may not pass the verification procedure because $h_{j-1} \neq h_{i-1}$ when $j \neq i$.

The replay attack may include a key-value pair replay.

The processor according to an embodiment may detect an attack on a whole SSTable and an individual key-value pair when the processor verifies the integrity (or freshness) using a MAC. In the scenario of the key-value pair replay, an attacker's strategy may be classified into three classes.

First, an attacker may try to replace one SSTable as a whole with another. The processor according to an embodiment may detect the attempt of the attacker when the processor obtains data blocks from the SSTable stored in the storage, and verify the data blocks through MAC computation. The attacker may be unable to obtain the appropriate MAC because the key-value pair that the attacker aims to replay has never been used to compute a MAC with an authentication key of a target SSTable. Each SSTable may be authenticated with its unique key, so the MACs associated with key-value pairs in another SSTable may be considered incorrect by the verification procedure.

Second, an attacker may try to replay data chunks within one SSTable. As described above, the processor according to an embodiment may detect a data chuck replay using the invariant order of SSTables in an LSM tree. If the replay is performed within a key block, the attacker may inevitably break the order. For example, if the attacker switches two object keys $k_1$ and $k_2$ to fabricate the object key $k_1$ to appear earlier than the object key $k_2$, the object key $k_2$ may appear earlier than the object key $k_1$, breaking the invariant order. For reference, duplicating an object key may not be an option as well because it breaks the uniqueness principle that an object key is included at most once in each level of the LSM tree.

Third, an attacker may try to replay across the key blocks within an SSTable. However, replaying the key blocks may violate the property of an index key of an index block of the SSTable, which partitions the set of object keys an SSTable contains into contiguous and mutually disjoint ranges.

A rollback attack may include taking a snapshot of data at some point and later presenting the snapshot of data to the security computer device or a user as the genuine and latest version. The processor according to an embodiment may ensure the latest version of data at the granularity of heartbeat transactions. An online rollback attack that an attacker performs while the processor is running may be infeasible because the attacker cannot replace the data stored within the EPC. However, an offline rollback attack in which the attacker replaces the files of the security computer device with an older version may be a realistic threat. To thwart the offline rollback attack, the processor according to an embodiment may periodically issue a write transaction. The processor may rely on periodic interaction with a user to timestamp the versions. The processor may determine the snapshot version based on the resulting key-value pairs of heartbeat transactions. The processor may have rollback resilience through the additional timestamps as the other verification mechanisms prevent the attacker from forging a snapshot. When given a snapshot to recover from, the processor may verify the freshness using a root pair of encryption key and authentication key, starting from the MANIFEST log. An attacker who does not have the root pair of encryption key and authentication key may be unable to make any modifications to any older snapshot version. Further, when an attacker presents an exact copy of an older version, the processor may correctly determine the presented copy of the version based on the key-value pairs from the heartbeat transactions after the verified recovery.

An existence attack may include any attempt to deceive it into believing that an SSTable does not contain a particular object key when, in fact, the SSTable has the object key. The processor according to an embodiment may consider a key-value pair obtained in a lower level as an older version of a key-value pair obtained in a higher level. The LSM tree-based KVSs may handle update requests by adding a new key-value pair to the higher level of the LSM tree and leave the existing key-value pair in a lower level. An attacker performing the existence attack may need to first find a key block that contains a victim key and forge a valid key block passing verification. The processor according to an embodiment may prevent an attacker from finding the key block containing the victim object key through the confidentiality ensured using encryption. When an attacker attacks an unknown key, the processor may be highly likely to detect the attack through the invariant check.

Hereinafter, the performance of the security computer device according to an embodiment and the performance of the security computer device according to a comparative embodiment are compared with reference to FIGS. 6 to 15.

The performance of the security computer device according to an embodiment may be evaluated on a system with Intel Xeon E-2288G and 64 GB of DRAM. The CPU may have 32 KB instruction and data caches, 256 KB of L2 caches, and a 16 MB shared L3 cache. The CPU may also implement Intel SGX for confidential computing and AES-NI to speed up AES block cipher. The system may run Ubuntu 18.04 with Linux Kernel 4.15. For every cryptographic operation, OpenSSL 1.1.1i may be used. Specifically, AES GCM 256 may be selected as the block cipher scheme to protect the confidentiality of the data, GHASH may be selected to compute MACs for the logs and MemTable, and HMAC with SHA3-384 may be selected to compute MACs for SSTables. The security computer device (TWEEZER) according to an embodiment may follow the cryptographic schemes that the security computer device (Speicher) according to a comparative embodiment used to rule out the performance impact of cryptographic schemes when compared with the security computer device (Speicher) according to a comparative embodiment. For reference, unlike the encryption or GHASH, the HMAC computation may not benefit from hardware acceleration because the CPU does not have hardware extensions to accelerate SHA computation. Both the security computer device (TWEEZER) according to an embodiment and the reproduced security computer device (Speicher) according to a comparative embodiment may be built based on RocksDB version 6.14.

The security computer device (TWEEZER) according to an embodiment may be evaluated using, as benchmarks, db_bench with three workloads, r100, r90w10, and r80w20. The three workloads may include the workload r100 with 100% reads, the workload r90w10 with 90% reads and 10% writes, and the workload r80w20 with 80% reads and 20% writes. The size of an object key may be 16 B, the size of an SSTable may be 64 MB, and 5 million key-value pairs may be used, as in the security computer device (Speicher) according to a comparative embodiment. The block size may be either 4 KB, which is the default of RocksDB, or 32 KB, which is used by the security computer device (Speicher) according to a comparative embodiment for evaluation. In some experiments, db_bench may be used to generate KVSs as large as 16 GB and 64 GB, and use the generated KVSs to evaluate the performance of the security computer device (TWEEZER) according to an embodiment on a practical setup.

Figure 6:
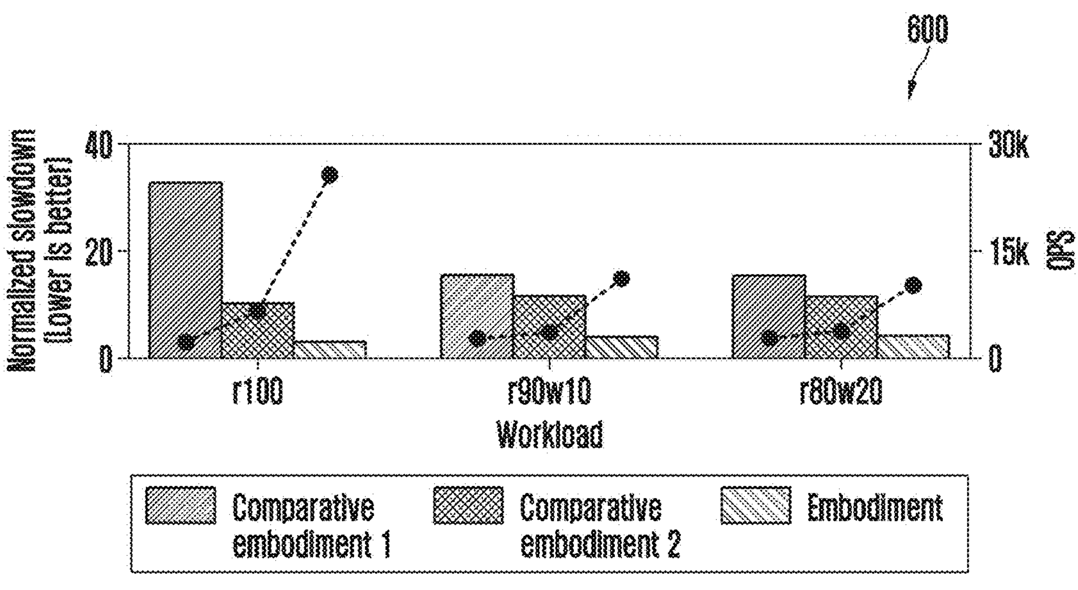
FIG. 6 illustrates the normalized slowdown, where an unmodified RockDB is a baseline, according to an embodiment and comparative embodiments.

FIG. 6 illustrates the normalized slowdown, where an unmodified RockDB is a baseline, according to an embodiment and comparative embodiments.

For comparison with the security computer device according to an embodiment (TWEEXER), the security computer device (Speicher) according to Comparative Embodiment 1 may be reproduced by extending RocksDB because the security computer device (Speicher) is not open-sourced. As described above with reference to FIG. 1, the security computer device (TWEEZER) according to an embodiment may adopt some of the design decisions of the security computer device (Speicher) according to a comparative embodiment to save EPC space and rely on an enclave (e.g., Scone) for asynchronous system calls. As such, the reproduced security computer device (reproduced Speicher) according to reproduced Comparative Embodiment 2 may share with the security computer device (TWEEZER) according to an embodiment.

As shown in FIG. 6, the normalized throughput of Embodiment (TWEEZER), Comparative Embodiment 1 (the reported Speicher), and Comparative Embodiment 2 (the reproduced Speicher) may be represented as bars, and the absolute throughput may be represented as lines. Hereafter, all normalized results may be normalized to the baseline RocksDB, presented with the absolute throughput. The experimental results may advocate that the security computer device according to Comparative Embodiment 2, as a reproduction of the security computer device according to Comparative Embodiment 1, is reasonable in that it exhibits similar or better performance characteristics compared with the reported number. In this experiment, 5 million transactions may be issued, starting from a KVS filled with 5 million entries, the value size may be set to 1024 B, and the block size may be set to 32 KB to replicate the experiments as close to those of the original setting]. The difference in experimental setup may have contributed to the better performance that the replicated Speicher (e.g., the security computer device according to Comparative Embodiment 2) exhibits compared to the original (e.g., the security computer device according to Comparative Embodiment 1). The security computer device (Speicher) according to Comparative Embodiment 1 may be evaluated on a system with Xeon E3-1270 v5. This system may have a smaller shared L3 cache (e.g., 8 MB shared L3 cache) and a smaller EPC (e.g., 128 MB EPC), albeit the size of main memory is the same. Larger EPC and caches may potentially reduce the number of cryptographic operations while the security computer device (Speicher) according to Comparative Embodiment 2 runs, reducing the overhead of storing data within the EPC. The security computer device (TWEEZER) according to an embodiment may outperform the security computer device (Speicher) according to Comparative Embodiment 2 by 1.91 to 3.94 times despite the fact that the KVSs run with smaller amount of data. The 5 million entries may be actually small enough that EPC paging does not occur, favoring the security computer device (Speicher) according to Comparative Embodiment 2 considerably.

Figure 7:
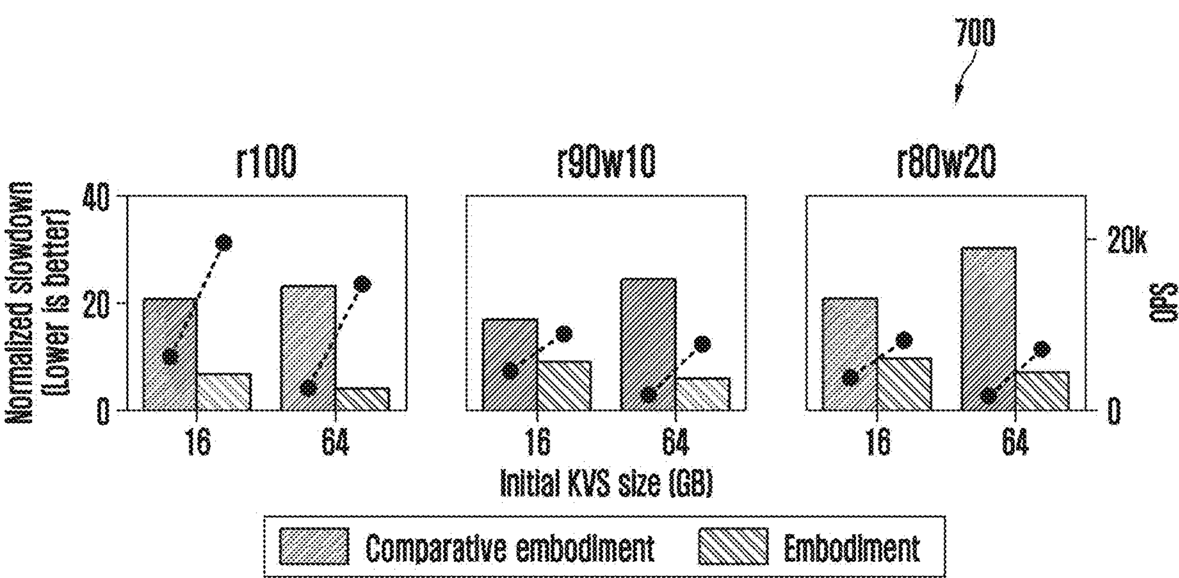
FIG. 7 illustrates the normalized slowdown of a security computer device, on three workloads, according to an embodiment and a comparative embodiment.

FIG. 7 illustrates the normalized slowdown of a security computer device, on three workloads, according to an embodiment and a comparative embodiment.

In FIG. 7, the normalized throughput of the security computer device (TWEEZER) according to an embodiment and the security computer device (Speicher) according to a comparative embodiment on three workloads from db_bench with varying initial KVS sizes and 1024 B values is shown. The block size may be set to 4 KB, and the block size of 4 KB may be the default and the best for the original RocksDB. Starting from the KVS images generated using db_bench, 5 million transactions may be issued to measure the throughput. Under the tests using the large KVSs, the security computer device (TWEEZER) according to an embodiment may consistently outperform the security computer device (Speicher) according to a comparative embodiment by 1.94 to 6.23 times, reducing the slowdown from 16 to 30 times to 4 to 9 times. This performance gap may be primarily due to EPC paging. As the KVS size increases, the footer cache of the security computer device (Speicher) according to a comparative embodiment in the EPC may become larger and cause frequent EPC paging. The use of per-SSTable keys may reduce the amount of data to be kept within the EPC, enabling the security computer device (TWEEZER) according to an embodiment to avoid the frequent EPC paging.

Figure 8:
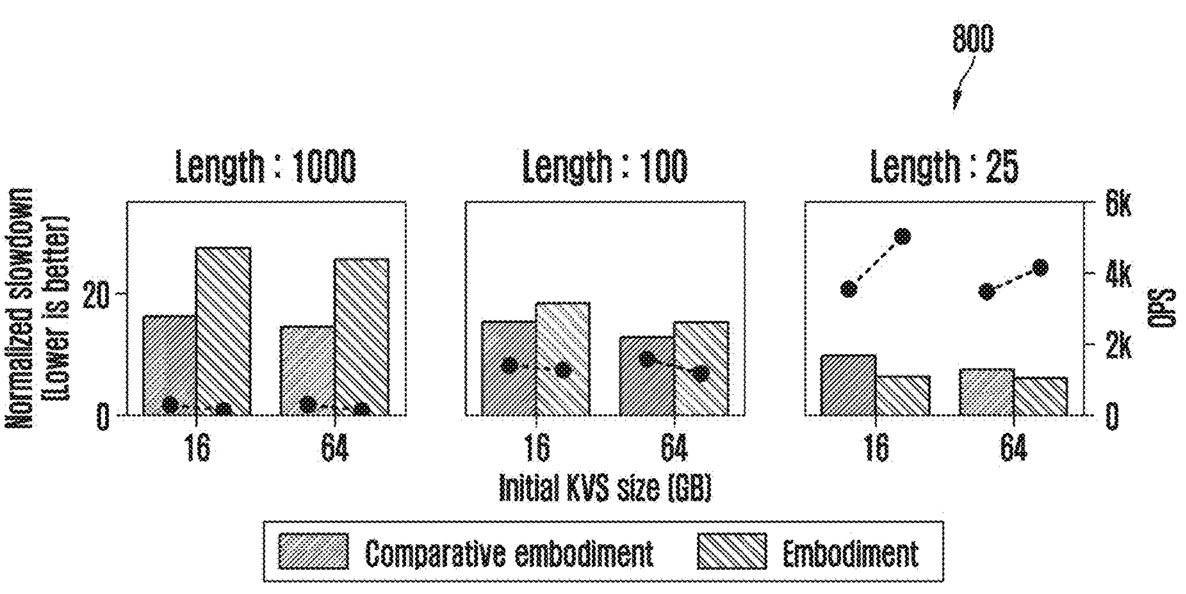
FIG. 8 illustrates the normalized slowdown of a security computer device, on the length of range queries, according to an embodiment and a comparative embodiment.

FIG. 8 illustrates the normalized slowdown of a security computer device, on the length of range queries, according to an embodiment and a comparative embodiment.

The range request (or range query) performance of the security computer device (TWEEZER) according to an embodiment and the security computer device (Speicher) according to a comparative embodiment may be evaluated using the seekrandom benchmark in db_bench, with 1024 B values and 32 KB data blocks. As shown in FIG. 8, the security computer device (TWEEZER) according to an embodiment may exhibit higher throughput than the security computer device (Speicher) according to a comparative embodiment for short range requests, but the advantage may diminish as the query request length increases. This result may be due to the fine-grained authentication that is optimized only for point lookups. When obtaining a key-value pair, the security computer device (TWEEZER) according to an embodiment may have the cryptographic cost that is smaller than that of the security computer device (Speicher) according to a comparative embodiment that decrypts and authenticates a whole data block even for a single request. However, this whole-block decryption and authentication may become less costly when handling range requests because the security computer device (Speicher) according to a comparative embodiment decrypts and authenticates the block only once for multiple pairs. Unlike this, the security computer device (TWEEZER) according to an embodiment may handle range queries like a sequence of point lookups, thus authenticating the key-value pairs separately.

Figure 9:
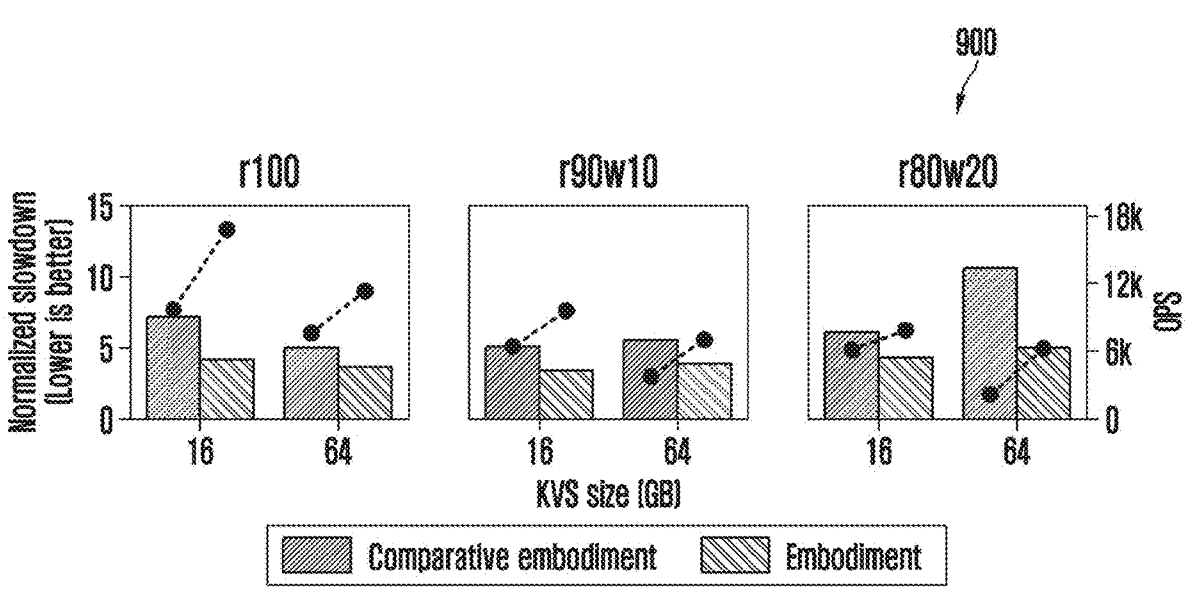
FIG. 9 illustrates the normalized slowdown of a security computer device with large data blocks, on three workloads, according to an embodiment and a comparative embodiment.

FIG. 9 illustrates the normalized slowdown of a security computer device with large data blocks, on three workloads, according to an embodiment and a comparative embodiment.

The data block size in an SSTable may be configured and may affect throughput. In experiments on point lookup performance, the default value of 4 KB block size was used, and as this setting results in the best performance for the baseline RocksDB, the security computer device (Speicher) according to a comparative embodiment may use 32 KB data blocks in their experiments. Thus, the same experiments obtained in FIG. 7 except with the data block size set to 32 KB may be performed. As shown in FIG. 9, the performance of the security computer device (Speicher) according to a comparative embodiment may improve considerably due to the reduction in EPC usage. Despite this, it may be seen that the security computer device (TWEEZER) according to a comparative embodiment still outperforms the security computer device (Speicher) according to a comparative embodiment by 1.46 to 2.17 times.

Figure 10:
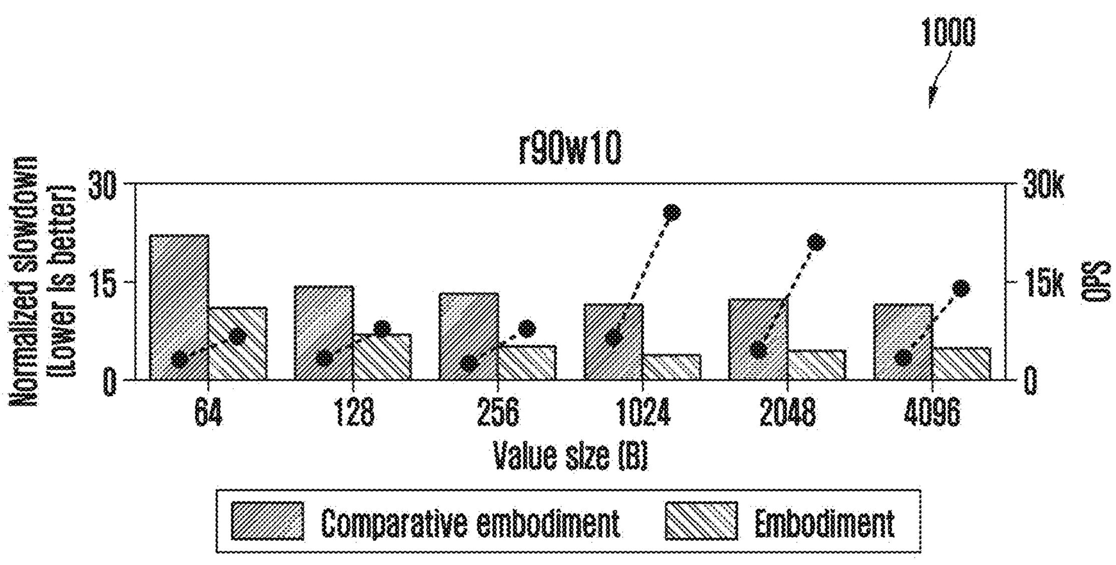
FIG. 10 illustrates the normalized slowdown of a security computer device, on value sizes, according to an embodiment and a comparative embodiment.

FIG. 10 illustrates the normalized slowdown of a security computer device, on value sizes, according to an embodiment and a comparative embodiment.

In FIG. 10, the effect of the value size on the performance of the security computer device (TWEEZER) according to an embodiment and the security computer device (Speicher) according to a comparative embodiment is shown. For these experiments, the same setup as the comparison study in FIG. 6 except for the value sizes may be used. Overall, the security computer device (TWEEZER) according to an embodiment may outperform the security computer device (Speicher) according to a comparative embodiment by 1.82 to 4.70 times in all configurations because the security computer device (TWEEZER) according to an embodiment, in part, suffers from read amplification, which diminishes as the value size increases, resulting in slowdown.

Figure 11:
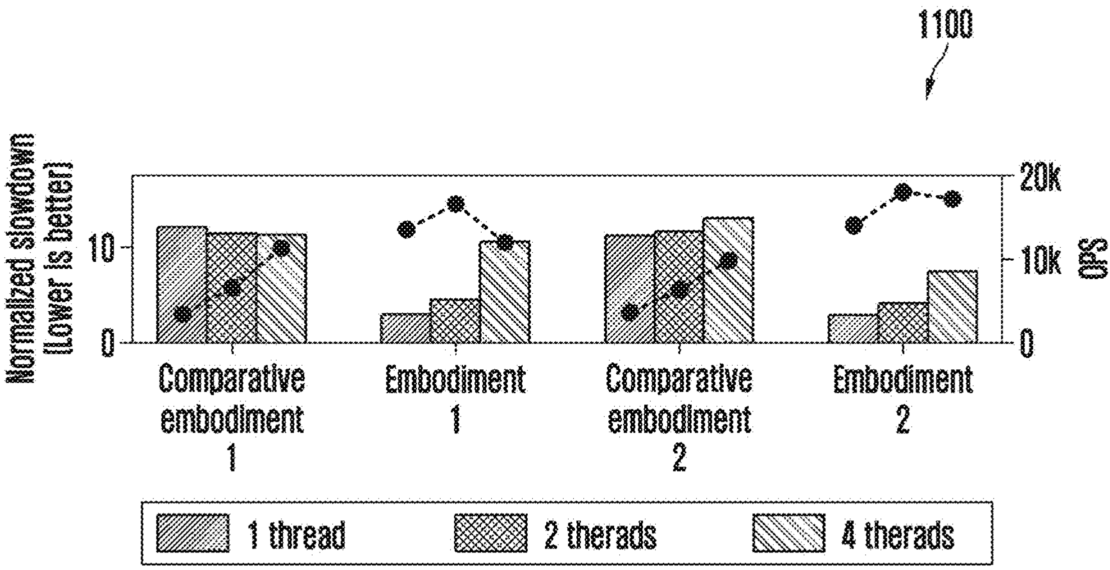
FIG. 11 illustrates the slowdown of a security computer device, on the number of threads, according to embodiments and comparative embodiments.

FIG. 11 illustrates the slowdown of a security computer device, on the number of threads, according to embodiments and comparative embodiments.

FIG. 11 shows the normalized throughput of the security computer devices (TWEEZER) according to embodiments and the security computer devices (Speicher) according to comparative embodiments as the number of threads increases. The security computer device (Speicher, musl) according to Comparative Embodiment 1 and the security computer device (Speicher, mi-malloc) according to Comparative Embodiment 2 may scale similarly to RocksDB, but the slowdown of the security computer devices (TWEEZER) according to embodiments may increase as the number of threads increases. This may be due to the default heap allocator of Scone, musl that does not scale as the number of threads increases. The security computer device (TWEEZER, mi-malloc) according to Embodiment 2 shows scalability when musl in the security computer device (TWEEZER, musl) according to Embodiment 1 is replaced with mi-malloc, but the benefit may be limited because Scone does not support the thread local storage model that mi-malloc uses. Nevertheless, the security computer devices (TWEEZER) according to embodiments may outperform the security computer devices (Speicher) according to comparative embodiments by 1.78 times when running with 4 threads.

Figure 12:
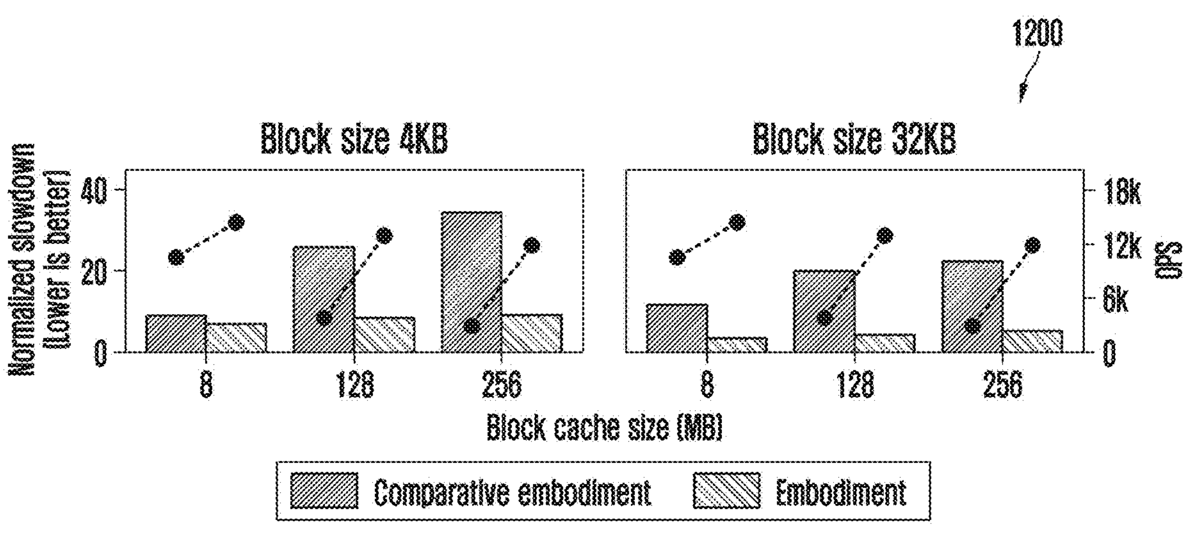
FIG. 12 illustrates the slowdown of a security computer device, on a block cache size, according to embodiments and comparative embodiments.

FIG. 12 illustrates the slowdown of a security computer device, on a block cache size, according to embodiments and comparative embodiments.

Fine-grained authentication may enable the security computer devices (TWEEZER) according to embodiments to place the block cache in untrusted memory (e.g., partial memory) distinct from the EPC. Having a block cache outside the EPC may be beneficial when the security computer devices (TWEEZER) according to embodiments start to serve large KVSs in which larger block cache could help reduce the average read latency. FIG. 12 presents the normalized throughput of the security computer devices (TWEEZER) according to embodiments and the security computer devices (Speicher) according to comparative embodiments as the block cache sizes are changed from 8 MB (default) to 128 MB and 256 MB using the same setup as the comparison study in FIG. 6. The performance overhead of the security computer devices (Speicher) according to comparative embodiments may increase as the block cache size increases because the additional block caches cause more EPC paging. The security computer devices (Speicher) according to comparative embodiments may place all block cache content in the EPC as the security computer devices (Speicher) do not make any adjustment to the block cache management, increasing EPC usage and resulting in more EPC paging. The security computer devices (TWEEZER) according to embodiments may not suffer from the increased number of EPC paging because the security computer devices (TWEEZER) place the block cache outside the EPC with the same cryptographic protection as the blocks in the SSTables. The security computer devices (TWEEZER) according to embodiments may still not benefit from the block caches as the absolute numbers show, however, due to the relatively small benefit that the block cache brings to the security computer devices (TWEEZER) according to embodiments compared to the unmodified RocksDB. Block cache miss penalty may be high in unmodified RocksDB because unmodified RocksDB decompresses the retrieved data block on cache misses. The security computer devices (TWEEZER) according to embodiments may have long cache hit latency, and may additionally decrypt and authenticate the retrieved pairs.

Figure 13:
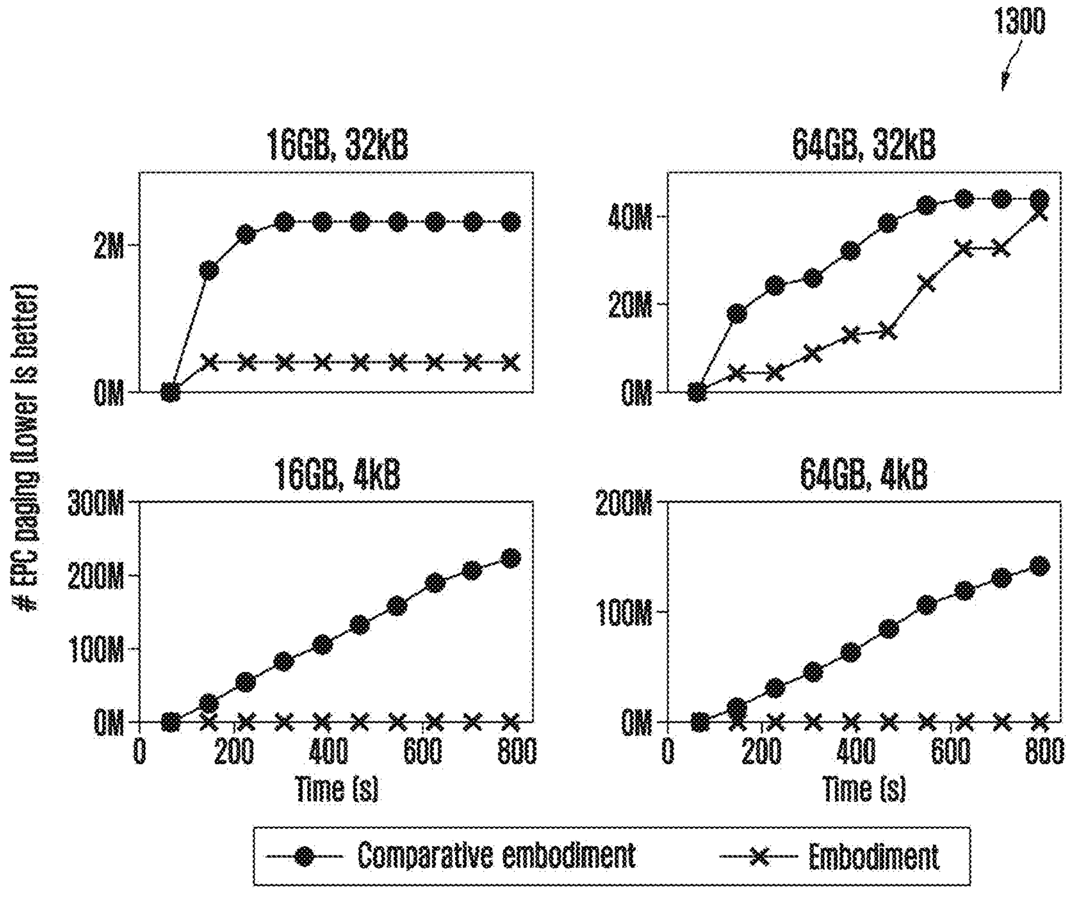
FIG. 13 illustrates the cumulative number of EPC paging for a security computer device according to an embodiment and a comparative embodiment.

FIG. 13 illustrates the cumulative number of EPC paging for a security computer device according to an embodiment and a comparative embodiment.

The number of EPC paging may be obtained using sgxtop. FIG. 13 shows the cumulative number of EPC paging observed while running the two configurations of the benchmarks used for the experiments in FIGS. 6 to 12. Specifically, all observed EPC paging from each run after the recovery may be accumulated because neither the security computer device (TWEEZER) according to an embodiment nor the security computer device (Speicher) according to a comparative embodiment is designed to optimize the recovery phase and both experience a large number of EPC paging. When the block size is configured to 4 KB (the bottom two in FIG. 10), which is the default and exhibits better performance for the security computer device (TWEEZER) according to an embodiment, the security computer device (Speicher) according to a comparative embodiment may suffer up to 430 times more EPC paging, due to the cached MACs in the footer blocks. On the contrary, when the block size is configured to be 32 KB, the cumulative number of EPC paging that the security computer device (TWEEZER) according to an embodiment experiences may approach that of the security computer device (Speicher) according to a comparative embodiment, even though the security computer device (TWEEZER) according to an embodiment still outperforms the security computer device (Speicher) according to a comparative embodiment in terms of throughput. The additional EPC paging of the security computer device (TWEEZER) according to an embodiment may come from background compaction. Compared with the security computer device (Speicher) according to a comparative embodiment, certain periods in time in which the cumulative EPC paging of the security computer device (TWEEZER) according to an embodiment suddenly increases may be observed. This may be due to the additional memory consumption by the background compaction, which also uses EPC space to process decrypted blocks. That is, the security computer device (TWEEZER) according to an embodiment may still show much higher performance albeit the EPC paging due to the compaction. This may be because the compaction does not usually block the transaction processing. The fine-grained authentication (§ 5.3) of the security computer device (TWEEZER) according to an embodiment may enable compaction with encrypted SSTables and reduce these peaks, but may be left as future work.

Figure 14:
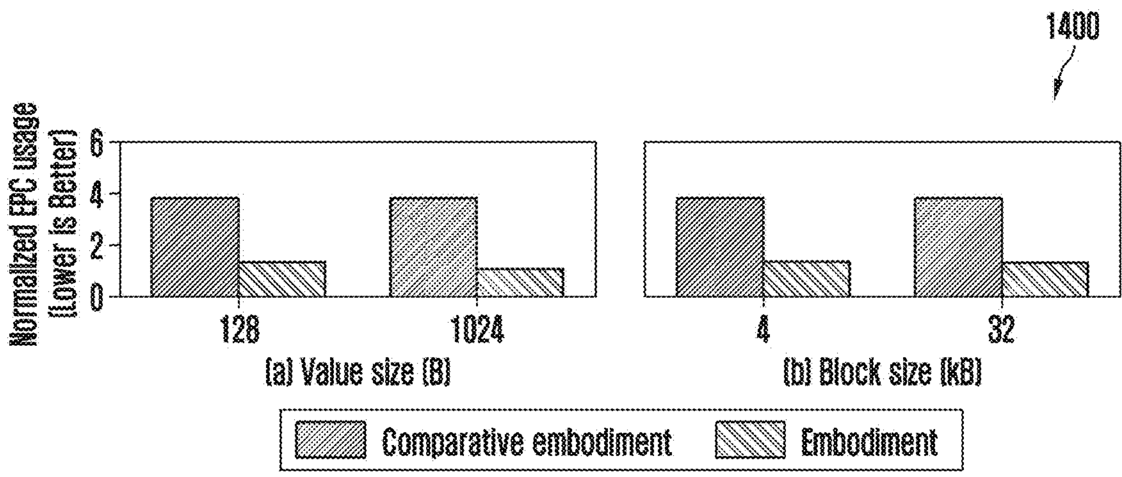
FIG. 14 illustrates the EPC usage for a security computer device according to an embodiment and a comparative embodiment.

FIG. 14 illustrates the EPC usage for a security computer device according to an embodiment and a comparative embodiment.

The amount of data in an EPC may be another measure that shows the potential density of EPC paging over time. Programs using more EPCs may be likely to experience more EPC misses and longer EPC access time on average. To compare the amount of data that the security computer device (TWEEZER) according to an embodiment and the security computer device (Speicher) according to a comparative embodiment store in the EPC, the size of the table cache that contains metadata for SSTables and resides in memory may be measured. A good estimate of the amount of data in the EPC may include the size of the table cache because the table cache is the largest component in the EPC by design. FIG. 14 shows the results for the workload with 90% reads as the value sizes and block sizes are varied. The table cache of the security computer device (Speicher) according to a comparative embodiment may be 3.71 to 4.17 times larger compared to that of RocksDB while the table cache of the security computer device (TWEEZER) according to an embodiment may be only 1.08 to 1.35 times larger. The security computer device (Speicher) according to a comparative embodiment may uses a table cache that is 2.84 to 3.08 times larger compared to the security computer device (TWEEZER) according to an embodiment. The design choice of using per-SSTable keys (see § 5.2) may help reduce the amount of data in the EPC, contributing to reduced EPC paging.

Figure 15:
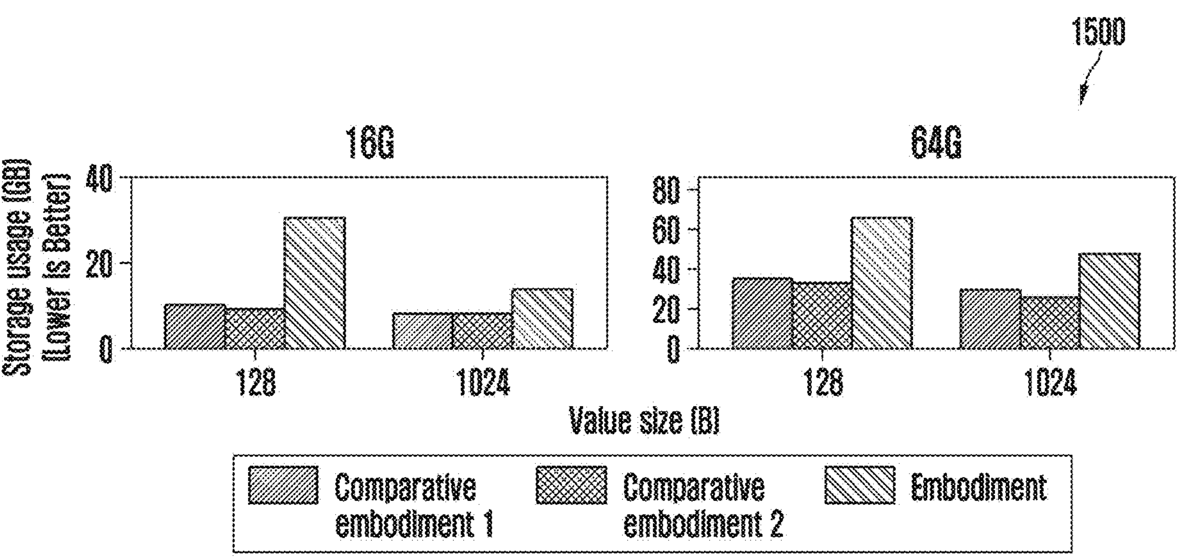
FIG. 15 illustrates the non-volatile memory usage for a security computer device according to an embodiment and comparative embodiments.

FIG. 15 illustrates the non-volatile memory usage for a security computer device according to an embodiment and comparative embodiments.

The non-volatile memory (e.g., storage) usage may increase due to the less productive compression after encryption and individual authentication for each key-value pair. The fine-grained authentication of the security computer device (TWEEZER) according to an embodiment may render the block compression of the security computer device (RocksDB) according to Comparative Embodiment 1 less effective because the data is encrypted before compression, unless the security computer device (TWEEZER) according to an embodiment employs a specially crafted encryption and compression scheme. The corresponding storage cost may be evaluated by measuring the size of aggregated SSTables, with compression, constituting the KVS in varying configurations used for the evaluations in FIGS. 6 to 12. As shown in FIG. 15, the security computer device (TWEEZER) according to an embodiment may experience 1.77 to 3.45 times storage overhead of the security computer device (RocksDB) according to Comparative Embodiment 1 and the security computer device (Speicher) according to Comparative Embodiment 2. The storage overhead may increase as the value size decreases because the MAC size remains the same for each key-value pair.

Figure 16:
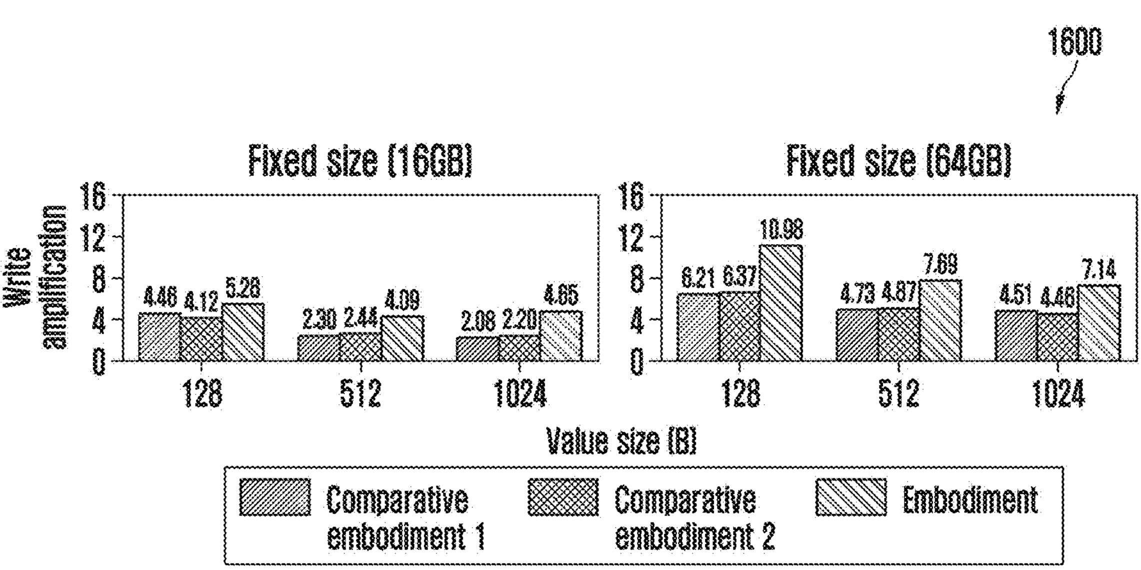
FIG. 16 illustrates write amplification for a security computer device according to an embodiment and comparative embodiments.

FIG. 16 illustrates write amplification for a security computer device according to an embodiment and comparative embodiments.

The amount of data that the security computer device (Speicher) according to Comparative Embodiment 2 and the security computer device (TWEEZER) according to an embodiment write to storage may be measured. FIG. 16 shows the amount of data that the security computer device (Speicher) according to Comparative Embodiment 2 and the security computer device (TWEEZER) according to an embodiment write to storage. The amount of written data may be normalized to the number of key-value pairs that each KVS accommodates to compare their impact on write amplification. As expected, write amplification may decrease as the value size increases when running the security computer device (RocksDB) according to Unmodified Comparative Embodiment 1 or the security computer device (Speicher) according to Comparative Embodiment 2 because the amount of metadata is proportional to the number of entries. When the total size of key-value pairs is fixed, less metadata may be written because fewer entries are stored as the value size increases. The write amplification of the security computer device (TWEEZER) according to an embodiment may also decrease, but much less than the other two. The reduced write amplification may be due to the entropy of data in data blocks. Unlike the security computer device (Speicher) according to Comparative Embodiment 2, the security computer device (TWEEZER) according to an embodiment may encrypt data blocks before compression, rendering compression less effective. On the evaluation with a 16 GB KVS, write amplification may even increase when the value size increases from 512 B to 1024 B.

Figure 17:
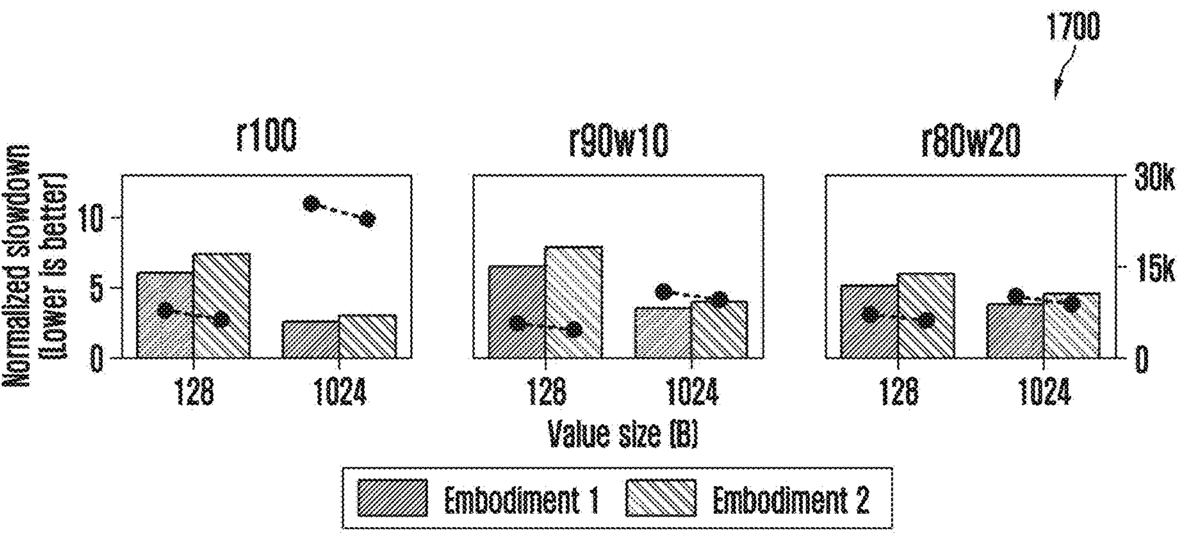
FIG. 17 illustrates the throughput of security computer devices according to embodiments.

FIG. 17 illustrates the throughput of security computer devices according to embodiments.

The security computer device (TWEEZER) according to Embodiment 1 may not be designed to be data-oblivious. That is, the security computer device (TWEEZER) according to Embodiment 1 may not be provably immune to side-channel leakage through data-dependent access patterns. For example, an attacker may learn the following information. By observing the changes of encrypted values in MemTable stored outside the EPC, the attacker may learn that a write request is made and handled. However, cryptographic protection may prevent the attacker from revealing or faulting the content. The relationship between leaves may also be under protection in that the internal nodes are stored within the EPC. Only a successful side-channel attack against an enclave may reveal such a relationship. Access patterns within an SSTable may reveal relationships between a queried key and index keys. The security computer device (TWEEZER) according to Embodiment 1 may not shuffle the data blocks in an SSTable, and the attacker may determine the data block from which the security computer device (TWEEZER) according to Embodiment 1 found the queried key through the access pattern. Combining these two, the attacker may infer the likely range of the queried key (e.g., how many keys in the SSTable would be larger than the queried key). The security computer device (TWEEZER) according to Embodiment 1 may mitigate this inference by shuffling the data blocks.

The security computer device (TWEEZER) according to Embodiment 1 may need to be tailored further to have better efficiency in EPC usage when the KVS size becomes larger. The security computer device (TWEEZER) according to Embodiment 1 may introduce much smaller amount of additional in-memory data that must be held in the EPC compared with the security computer device (Speicher) according to a comparative embodiment. However, the amount of data that the security computer device (TWEEZER) according to Embodiment 1 holds in the EPC may still increase as the KVS size increases because of some data (e.g. index blocks) that the security computer device (TWEEZER) according to Embodiment 1 still caches within the EPC, as an extension of RocksDB. The optimization of RocksDB metadata may be left as future work to further reduce the EPC usage.

The security computer device (TWEEZER) according to Embodiment 1 may not provably prevent a fault attack against key blocks, although it is highly unlikely for an attacker to successfully perform the attack. Not provably preventing the fault attack against the key blocks may be due to the lack of MAC-based verification of the key blocks. As an alternative design choice, the security computer device (TWEEZER) according to Embodiment 2 may be strengthened by computing and verifying MACs for the key blocks, in addition to the security computer device (TWEEZER) according to Embodiment 1. FIG. 17 shows the result of experiments showing the performance overhead of a design choice of the MAC computation and verification of the key blocks. As expected, the security computer device (TWEEZER+) according to Embodiment 2 may cause performance overhead. The security computer device (TWEEZER+) according to Embodiment 2 may be 11% to 24% slower than the security computer device (TWEEZER) according to Embodiment 1 depending on workloads and value sizes. The overhead may increase with a smaller value size because the key block size increases as the value size decreases.

Hereinafter, research on the security computer device according to an embodiment will be described.

The security computer device according to an embodiment may be closely related to existing attempts to tailor various important application programs to Intel SGX as well as research on securing database systems including KVSs.

Systems designed to help unmodified applications to run on an enclave may include, for example, Haven, SCONE, Graphene-SGX, Panoply, and SGX-LKL. A persistent KVS for Intel SGX may be quickly tailored. In particular, the security computer device (TWEEZER) according to an embodiment may have been implemented and tested on SCONE. However, the security computer device (TWEEZER) according to an embodiment may run on any of the aforementioned systems because the security computer device (TWEEZER) does not make any assumptions about features unique to SCONE.

As repeatedly discussed, the security computer device (Speicher) according to a comparative embodiment may be the closest to the security computer device according to an embodiment in that it is designed to boost the performance of a persistent KVS on SGX, taking RocksDB as an example. The security computer device (Speicher) according to a comparative embodiment may contribute three new design features to achieve this goal, but may fail to scale to large KVSs. While the security computer device (TWEEZER) according to an embodiment adopts many of the ideas proposed by the security computer device (Speicher) according to a comparative embodiment, the security computer device (TWEEZER) may propose a new message authentication scheme and restructure the data block to alleviate the scalability issue. Furthermore, the security computer device (TWEEZER) according to an embodiment may use a hash chain mechanism to protect persistent logs allowing for a solution that is not bound to platforms that support trusted counters. Enclage may be close to the security computer device (TWEEZER) according to an embodiment in that it is designed to be an SGX-based secure storage engine but may not take integrity protection into account.

In ShieldStore, the design options to adapt an in-memory KVS for SGX may be studied. Compared with TWEEZER, ShieldStore may be designed for in-memory KVSs and may still rely on the Merkle tree for freshness. Similar to ShieldStore, EnclaveCache and Avocado may also be designed to use SGX to protect in-memory KVSs.

CryptDB may be one of the pioneering systems in which unmodified database queries are proxied and handled by an encrypted backend. CryptDB may adopt various cryptographic schemes including homomorphic encryption and focus on confidentiality guarantees. Dory may go beyond confidentiality guarantees and mitigate access pattern-based leakage, providing authenticity relying on distributed trust. The security computer device (TWEEZER) according to an embodiment may tackle the same issue at a lower level compared with these approaches in that many relational database systems use RocksDB-like persistent KVSs as storage engines. The security computer device (TWEEZER) according to an embodiment may lack data obliviousness. The security computer device (TWEEZER) according to an embodiment may be strengthened with oblivious search indices or file system operations.

Protection of logs from rollback attacks may be an important problem for a long time. One of the well-known mechanisms may include the hash chain that the security computer device (TWEEZER) according to an embodiment adopts to protect the WAL and MANIFEST logs. However, the hash chain may not guarantee freshness against potential rollback attacks across crashes and recoveries as discussed in "Bryan Parno, Jacob R. Lorch, John R. Douceur, James Mickens, and Jonathan M. McCune. Memoir: Practical state continuity for protected modules. In Proceedings of the 32nd IEEE Symposium on Security and Privacy (Oakland), Oakland, CA, May 2011" (Memoir). Memoir may overcome this limitation and rely on local trusted non-volatile memory. The security computer device disclosed in "Nikolaos Karapanos, Alexandros Filios, Raluca AdaPopa, and Srdjan Capkun. Verena: End-to-end integrity protection for web applications. In Proceedings of the 37th IEEE Symposium on Security and Privacy (Oakland), San Jose, CA, May 2016" (Verena) may also address a similar problem using a hash server. Compared with these, the approach of the security computer device (TWEEZER) according to an embodiment may be similar to Verena in that the security computer device (TWEEZER) relies on a user, who sends heartbeat transactions to timestamp versions. ROTE, the security computer device disclosed in "Sinisa Matetic, Mansoor Ahmed, Kari Kostiainen, Aritra Dhar, David Sommer, Arthur Gervais, Ari Juels, and Srdjan Capkun. {ROTE}: Rollback protection for trusted execution. In 26th {USENIX}Security Symposium ({USENIX}Security 17), pages 1289-1306, 2017" may be designed solely to address requiring a trusted component to defeat the rollback attack using multiple enclaves. The security computer device (TWEEZER) according to an embodiment may adopt this to provide rollback resilience without relying on the heartbeat packets.

Herein, proposed may be the security computer device (TWEEZER) according to an embodiment including an LSM tree-based persistent key-value storage tailored for confidential computing by taking advantage of the LSM tree design principles. The unique invariants that the LSM tree introduces, being a data structure optimized for storage devices, may enable the security computer device (TWEEZER) according to an embodiment to avoid constructing a large Merkle tree to protect the integrity and freshness of the key-value pairs. As shown through the experiments with the security computer device (TWEEZER) according to an embodiment and the security computer device (reproduced Speicher) according to a comparative embodiment, this new MAC scheme for the LSM tree may bring considerable performance benefits. The implementation of the security computer device (TWEEZER) according to an embodiment may outperform the security computer device (Speicher) according to a comparative embodiment on point lookups (e.g., by 1.91 to 6.23 times) in all evaluation settings, and in particular, the settings with large KVSs (e.g., 16 GB to 64 GB KVSs).

The security computer device (Speicher) according to a comparative embodiment may present a design to efficiently protect the data structures that persistent KVSs have. In the security computer device (Speicher) according to a comparative embodiment, a Merkle tree may be used for protection with encryption and MAC. However, the Merkel tree may induce have longer latency for data retrieval from the LSM tree in the security computer device (Speicher) according to a comparative embodiment, compared to the security computer device according to an embodiment, and increase the use of EPC pages by other caches as described later, slowing down the KVS by up to 32.5 times.

The security computer device (TWEEZER) according to an embodiment may share the same goal as the security computer device (Speicher) according to a comparative embodiment. The security computer device (TWEEZER) according to an embodiment may be an extension of RocksDB, a popular LSM tree-based persistent KVS, that uses the MAC scheme tailored for LSM trees to run efficiently in an SGX enclave. The security computer device (TWEEZER) according to an embodiment may be different from the security computer device (Speicher) according to a comparative embodiment in the following three design decisions.

First, the security computer device (TWEEZER) according to an embodiment may ensure the freshness of an LSM tree without constructing a Merkle tree spanning across sorted string tables (SSTables). An LSM tree-based KVS of the LSM tree may include many SSTables, each containing many key-value pairs and remain immutable once built until compacted. Thus, the processor may perform authentication using an authentication key mapped to an SSTable (herein, also referred to as the unique key of the SSTable) and may not reuse the authentication key for another SSTable. In the security computer device according to an embodiment, an attacker may not find other pieces of data of a target SSTable anywhere other than the target SSTable (e.g., the other SSTable) to perform a replay attack.

Second, the uniqueness of object keys in each data block and invariant order of key blocks may enable the security computer device (TWEEZER) according to an embodiment to encrypt and authenticate each key-value pair separately with the capability of detecting replays within an SSTable. The invariant order among and within the data blocks may enable the security computer device (TWEEZER) according to an embodiment to detect any attack on freshness without the Merkle tree generated for each SSTable.

Third, the classic hash chain may be a good fit for authenticating the two logs: the WAL and MANIFEST logs. Hash chains may allow the security computer device (TWEEZER) according to an embodiment to authenticate the logs without trusted counters, which the security computer device (Speicher) according to a comparative embodiment relies on, as well as to generate as many new log entries as needed.

The security computer device (TWEEZER) according to an embodiment may be implemented by extending RocksDB 6.14 and using Scone. Scone may include a library operating system designed to run unmodified applications in an SGX enclave. Besides the LSM tree-tailored message authentication scheme, the security computer device according to an embodiment may adopt the design choices for the security computer device (Speicher) according to a comparative embodiment for components (e.g., MemTable). The security computer device (Speicher) according to a comparative embodiment may be reproduced for a comparison study due to the lack of an open-source version. As described with reference to FIG. 6, the reproduced security computer device (Speicher) according to a comparative embodiment may provide similar performance characteristics.

The security computer device (TWEEZER) according to an embodiment may achieve the expected performance gain and EPC efficiency. The performance gain and EPC efficiency of the security computer device according to an embodiment may be represented using db_bench, the standard benchmark used for RocksDB. When tested with extensive data, the security computer device (TWEEZER) according to an embodiment may outperform the security computer device (Speicher) according to a comparative embodiment by 1.94 to 6.23 times depending on the workload and the data size. In the evaluations using the same benchmark configuration that the security computer device (Speicher) according to a comparative embodiment was evaluated with, the security computer device (TWEEZER) according to an embodiment may exhibit 1.91 to 3.94 times performance benefits compared to the reproduced security computer device (Speicher) according to a comparative embodiment. The performance improvement of the security computer device according to an embodiment may be due to the 5.24 to 7.57 times reduction in EPC paging frequency compared to the security computer device according to a comparative embodiment.

The embodiments described herein may be implemented using a hardware component, a software component and/or a combination thereof. For example, the device, method, and components described in the embodiments may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The method according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

A number of embodiments have been described above. Nevertheless, it should be understood that various modifications may be made to these embodiments. For example, suitable results may be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

The invention claimed is:

1. A method, performed by a processor, comprising:

receiving a lookup request comprising an object key from a user;

retrieving the object key from a table stored in an enclave page cache (EPC) of a memory;

retrieving the object key from a table of a log-structured merge-tree stored in a storage distinct from the memory, when the object key fails to be retrieved from the table stored in the EPC;

obtaining a value corresponding to the object key and a reference message authentication code from the storage, when the object key is retrieved from a target table of the log-structured merge-tree stored in the storage; and verifying an integrity of the value based on the reference message authentication code;

wherein the obtaining of the value corresponding to the object key and the reference message authentication code from the storage comprises:

obtaining the value corresponding to the object key and the reference message authentication code corresponding to the value from a value block of a target data block, when the object key is retrieved from a key block of the target data block.

2. The method of claim 1, wherein the verifying of the integrity of the value based on the reference message authentication code comprises:

obtaining, from the EPC, a target authentication key mapped to the target table among authentication keys mapped to tables of the log-structured merge-tree;

computing a comparative message authentication code for the value, based on the target authentication key obtained from the EPC and the value obtained from the storage; and verifying the integrity of the value by comparing the computed comparative message authentication code with the obtained reference message authentication code.

3. The method of claim 1, wherein the retrieving of the object key from the table of the log-structured merge-tree stored in the storage comprises:

initiating a retrieval of the object key, starting from a lowest level of the log-structured merge-tree stored in the storage;

re-retrieving the object key from a level subsequent to a level at which the retrieval of the object key is being performed, when the object key fails to be retrieved at the level at which the retrieval of the object key is being performed; and terminating the retrieval of the object key, when the object key is retrieved at the level at which the retrieval of the object key is being performed.

4. The method of claim 1, wherein the retrieving of the object key from the table of the log-structured merge-tree stored in the storage comprises:

determining a target data block having a possibility of including the object key, based on an index block of the target table among a plurality of data blocks of the target table of the log-structured merge-tree, the index block indicating a range of an object key included in the plurality of data blocks;

verifying an order of a key block having object keys of a plurality of key-value pairs of the target data block; and retrieving the object key from the key block, when the order of the key block of the target data block is verified.

5. The method of claim 4, wherein the retrieving of the object key from the table of the log-structured merge-tree stored in the storage further comprises:

re-retrieving the object key by changing the target table to a table of a subsequent level of the target table, when the object key fails to be retrieved from the key block of the target data block.

6. The method of claim 1, further comprising:

obtaining a reference message authentication code corresponding to the object key and a target authentication key corresponding to a table stored in the EPC from the EPC, when the object key is retrieved from the table stored in the EPC;

obtaining a value corresponding to the object key from a partial memory of the memory distinct from the EPC; and verifying the integrity of the value based on the reference message authentication code.

7. The method of claim 6, wherein the verifying of the integrity of the value based on the reference message authentication code comprises:

computing a comparative message authentication code based on the target authentication key mapped to the table stored in the EPC obtained from the EPC and the value obtained from the partial memory distinct from the EPC; and verifying the integrity of the value by comparing the computed comparative message authentication code with the reference message authentication code.

8. A computer program stored in a computer-readable storage medium to execute the method of claim 1 in combination with hardware.

9. A device comprising:

a memory comprising an enclave page cache (EPC) and a partial memory distinct from the EPC;

a storage distinct from the memory;

a processor configured to receive a lookup request comprising an object key from a user, retrieve the object key from a table stored in the EPC, retrieve the object key from a table of a log-structured merge-tree stored in a storage distinct from the memory, when the object key fails to be retrieved from the table stored in the EPC, obtain a value corresponding to the object key and a reference message authentication code from the storage, when the object key is retrieved from a target table of the log-structured merge-tree stored in the storage, and verify an integrity of the value based on the reference message authentication code;

wherein the processor is configured to:

obtain the value corresponding to the object key and the reference message authentication code corresponding to the value from a value block of a target data block, when the object key is retrieved from a key block of the target data block.

10. The device of claim 9, wherein the processor is configured to:

obtain, from the EPC, a target authentication key mapped to the target table among authentication keys mapped to tables of the log-structured merge-tree, compute a comparative message authentication code for the value, based on the target authentication key obtained from the EPC and the value obtained from the storage, and verify the integrity of the value by comparing the computed comparative message authentication code with the obtained reference message authentication code.

11. The device of claim 9, wherein the processor is configured to:

initiate a retrieval of the object key, starting from a lowest level of the log-structured merge-tree stored in the storage, re-retrieve the object key from a level subsequent to a level at which the retrieval of the object key is being performed, when the object key fails to be retrieved at the level at which the retrieval of the object key is being performed, and terminate the retrieval of the object key, when the object key is retrieved at the level at which the retrieval of the object key is being performed.

12. The device of claim 9, wherein the processor is configured to:

determine a target data block having a possibility of including the object key, based on an index block of the target table among a plurality of data blocks of the target table of the log-structured merge-tree, the index block indicating a range of an object key included in the plurality of data blocks, verify an order of a key block having object keys of a plurality of key-value pairs of the target data block, and retrieve the object key from the key block, when the order of the key block of the target data block is verified.

13. The device of claim 12, wherein the processor is configured to:

re-retrieve the object key by changing the target table to a table of a subsequent level of the target table, when the object key fails to be retrieved from the key block of the target data block.

14. The device of claim 9, wherein the processor is configured to:

obtain a reference message authentication code corresponding to the object key and a target authentication key corresponding to a table stored in the EPC from the EPC, when the object key is retrieved from the table stored in the EPC, obtain a value corresponding to the object key from a partial memory of the memory distinct from the EPC, and verify the integrity of the value based on the reference message authentication code.

15. The device of claim 14, wherein the processor is configured to:

compute a comparative message authentication code based on the target authentication key mapped to the table stored in the EPC obtained from the EPC and the value obtained from the partial memory distinct from the EPC, and verify the integrity of the value by comparing the computed comparative message authentication code with the reference message authentication code.

* * * * *